United States Patent
Hanano et al.

(12) 
(10) Patent No.: US 6,535,194 B1
(45) Date of Patent: Mar. 18, 2003

(54) IMAGE DISPLAY USING WOBBLING

(75) Inventors: Kazunari Hanano, Hachioji (JP); Naoto Shimada, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/309,442

(22) Filed: May 11, 1999

(30) Foreign Application Priority Data

May 11, 1998 (JP) .......................... 10-127172

(51) Int. Cl.[7] .............................. G09G 3/36; G09G 5/02; G02B 5/30; G02E 1/13
(52) U.S. Cl. .................. 345/101; 345/698; 359/499; 349/196
(58) Field of Search ..................... 345/30, 31, 101, 345/32, 87, 428, 88, 204, 213, 214, 694, 696, 697, 698; 348/42, 54, 56, 57, 59, 767; 349/74, 75, 76, 117, 196, 197, 200, 201, 202; 359/196, 197, 494, 495, 497, 499

(56) References Cited

U.S. PATENT DOCUMENTS

| | | | | | |
|---|---|---|---|---|---|
| 4,338,600 A | * | 7/1982 | Leach | .......................... | 345/101 |
| 4,745,403 A | * | 5/1988 | Tamura | ........................ | 345/101 |
| 5,537,256 A | * | 7/1996 | Fergason | ...................... | 359/495 |
| 5,572,341 A | * | 11/1996 | Fergason | ...................... | 349/200 |
| 5,689,283 A | * | 11/1997 | Shirochi | ...................... | 345/698 |
| 5,715,029 A | * | 2/1998 | Fergason | ...................... | 349/196 |
| 5,842,762 A | * | 12/1998 | Clarke | .......................... | 348/767 |
| 5,971,546 A | * | 10/1999 | Park | .............................. | 345/56 |
| 6,061,103 A | * | 5/2000 | Okamura et al. | ............ | 348/767 |
| 6,184,969 B1 | * | 2/2001 | Fergason | ...................... | 349/196 |
| 6,188,382 B1 | * | 2/2001 | Okamura et al. | ............ | 345/669 |
| 6,219,017 B1 | * | 4/2001 | Shimada et al. | .............. | 345/88 |
| 6,256,006 B1 | * | 7/2001 | Yamamoto et al. | .......... | 345/101 |

FOREIGN PATENT DOCUMENTS

JP 6-324320 11/1994

* cited by examiner

*Primary Examiner*—Steven Saras
*Assistant Examiner*—Paul A. Bell
(74) *Attorney, Agent, or Firm*—Ostrolenk, Faber, Gerb & Soffen, LLP

(57) ABSTRACT

In an image display comprising a display element having a display surface with a regular array of a plurality of pixels, an image display control means for displaying different images different in successive fields on the display element, and a vibrating means for vibrating the optical axis of light emitted from the display surface in predetermined directions in synchronism to the switching of images by the image display control means, a temperature control means for the temperature of the vibrating means is provided. With the provision of the temperature of the vibrating means, it is possible to effectively improve the wobbling effect reduction due to the temperature dependency of the response characteristic of the vibrating means.

11 Claims, 36 Drawing Sheets

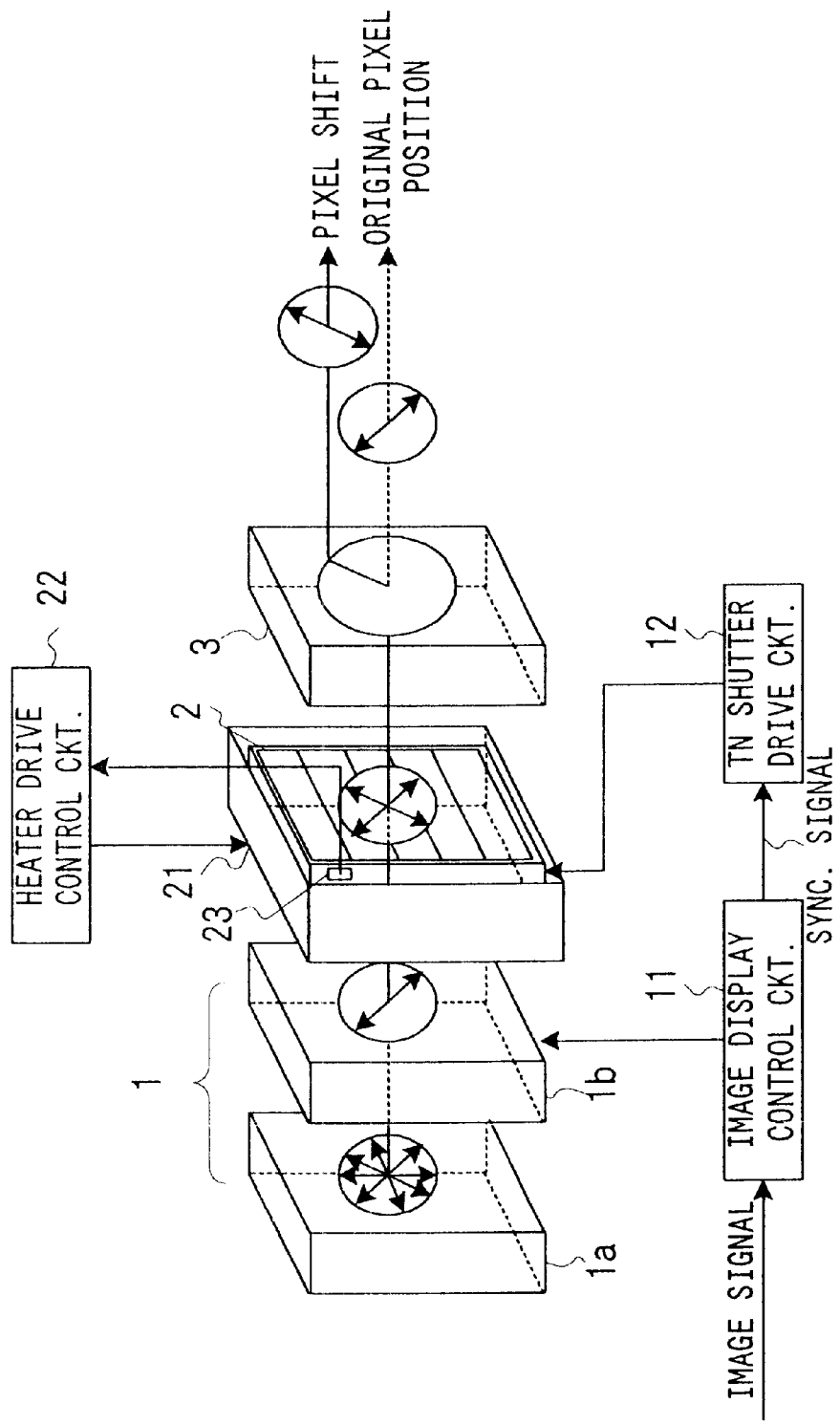

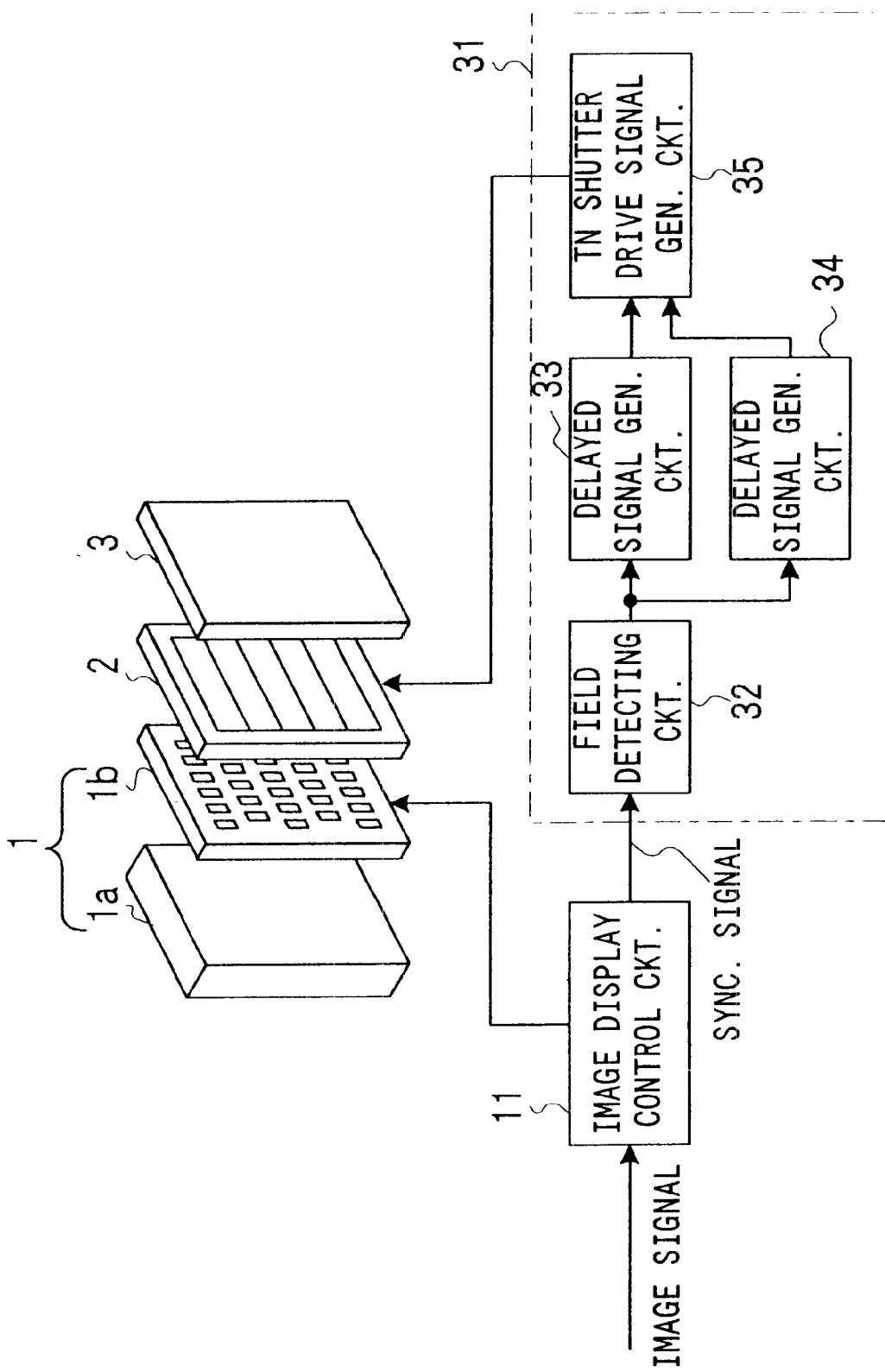

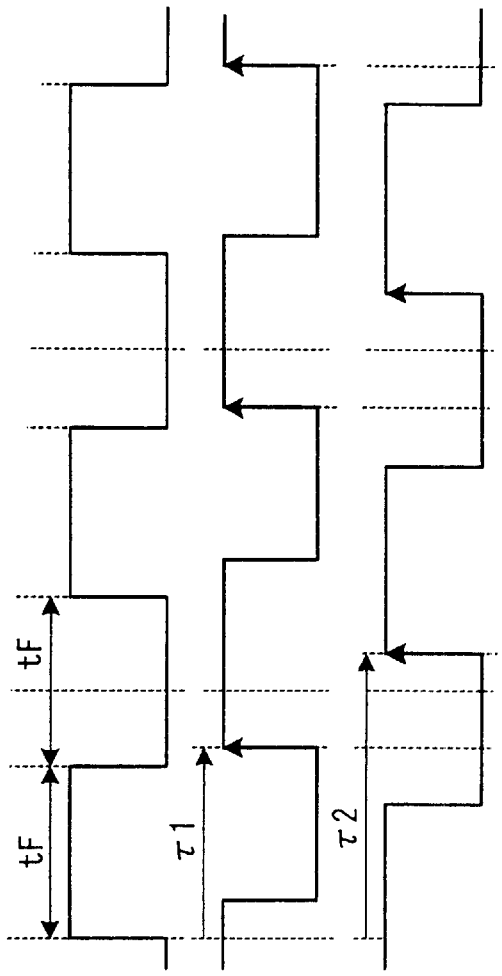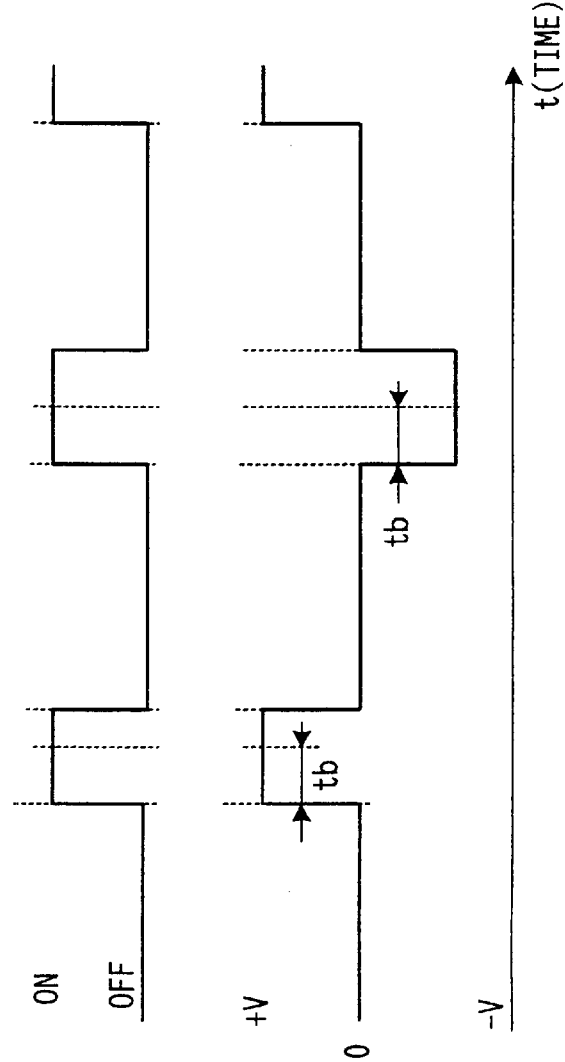

FIG.7(a)
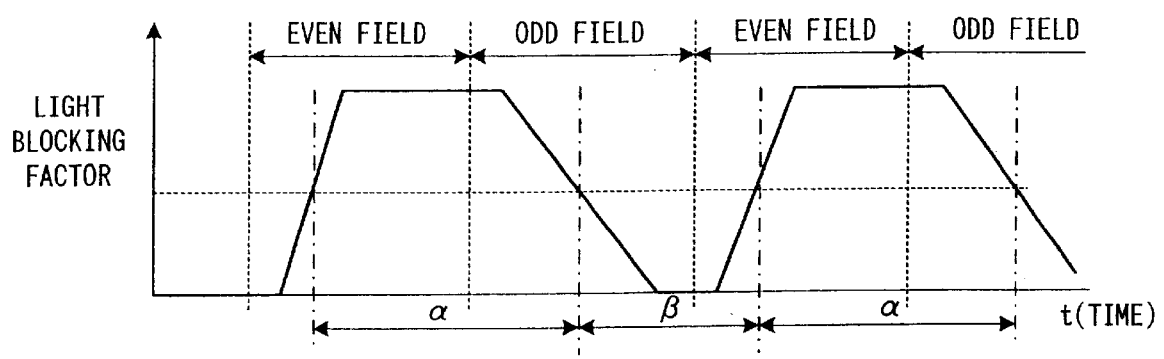
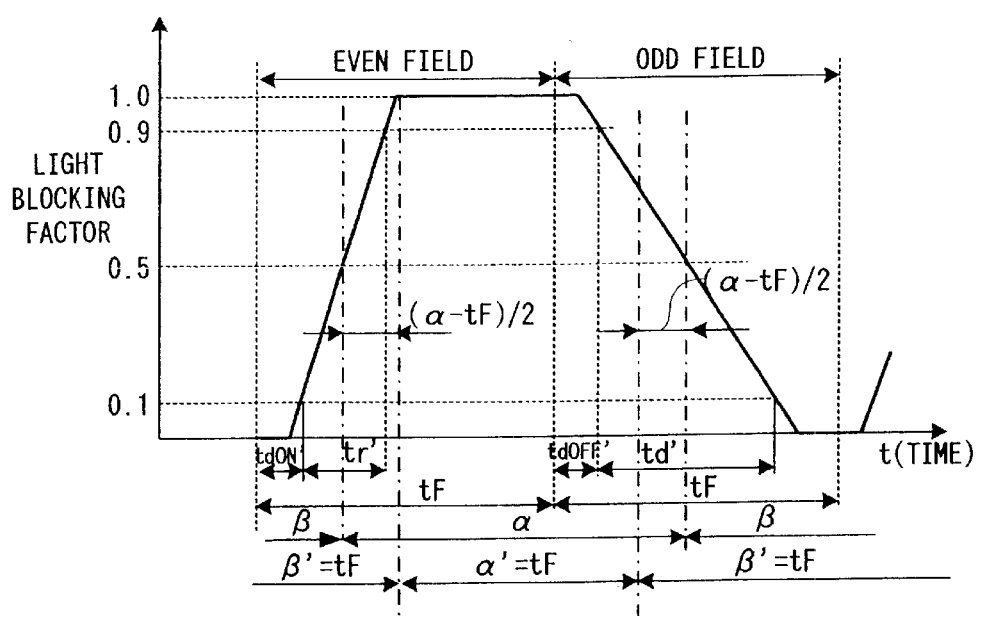
FIG.7(b)

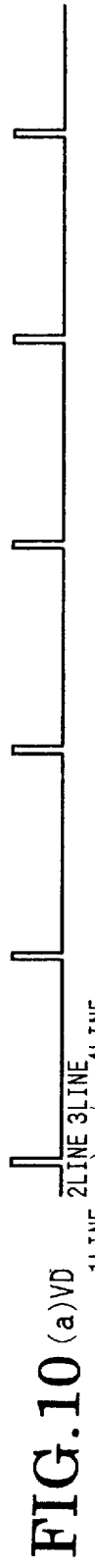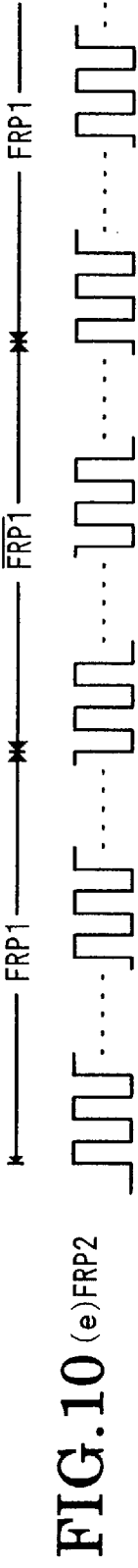
FIG.10 (a) VD
FIG.10 (b) FRP1
FIG.10 (c) VD/4
FIG.10 (d) $\overline{FRP1}$
FIG.10 (e) FRP2

FIG.16(a)
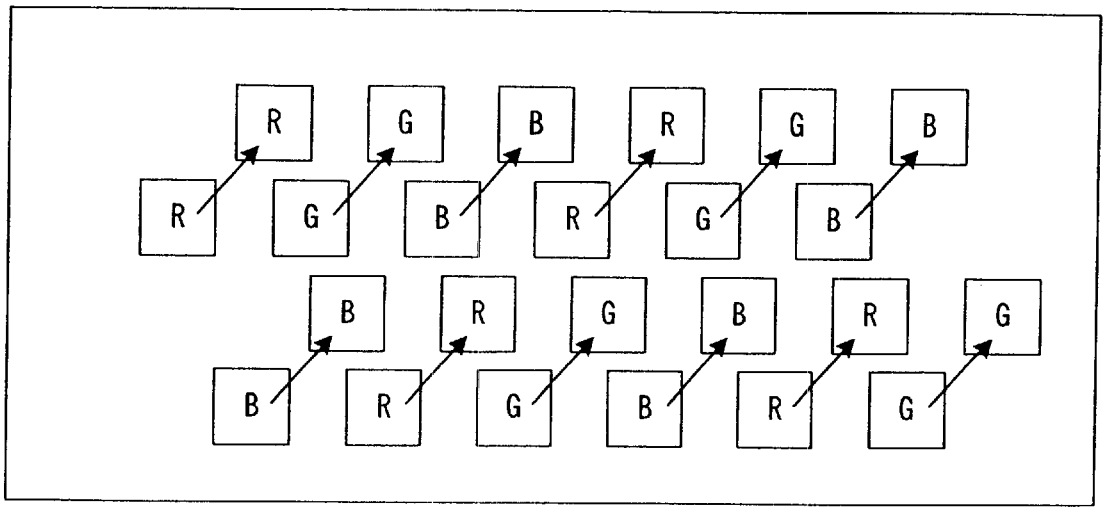
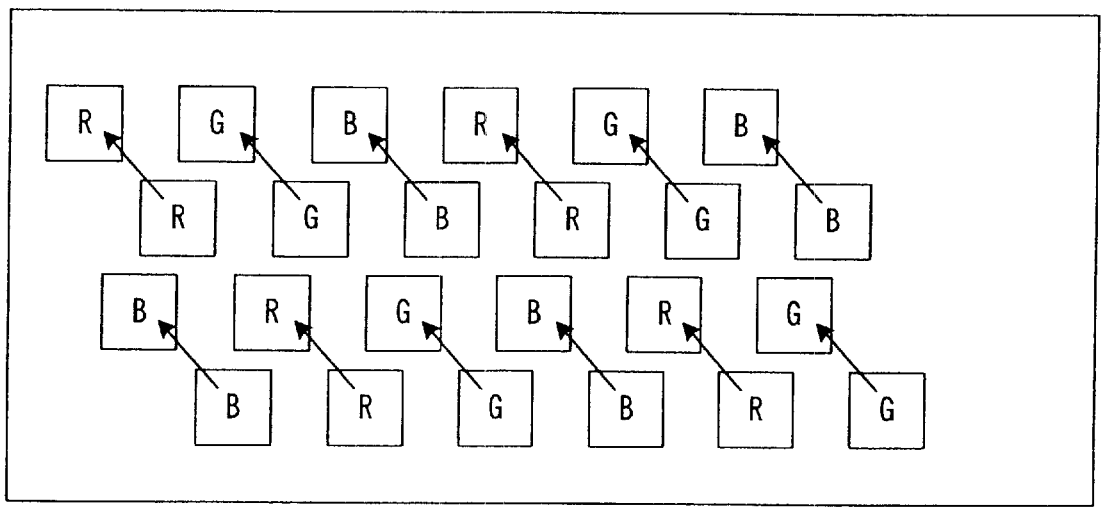
FIG.16(b)

FIG.33 (a) PRIOR ART
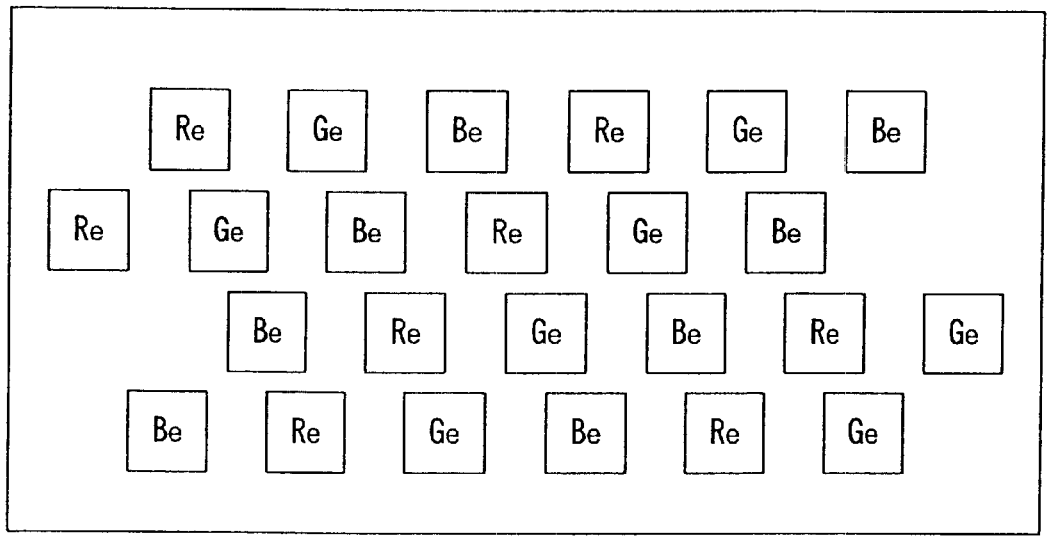
FIG.33 (b) PRIOR ART
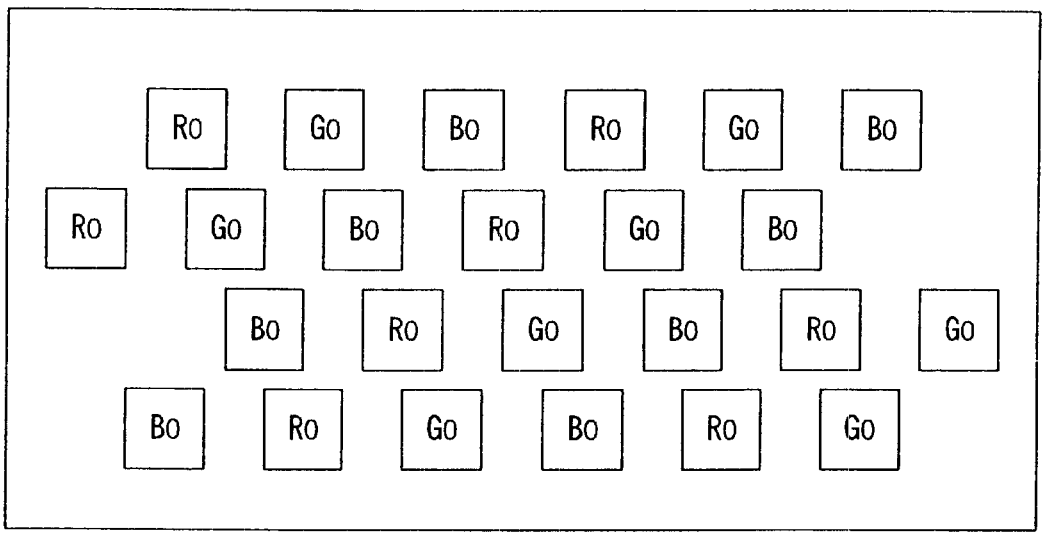

FIG.34 (a) PRIOR ART
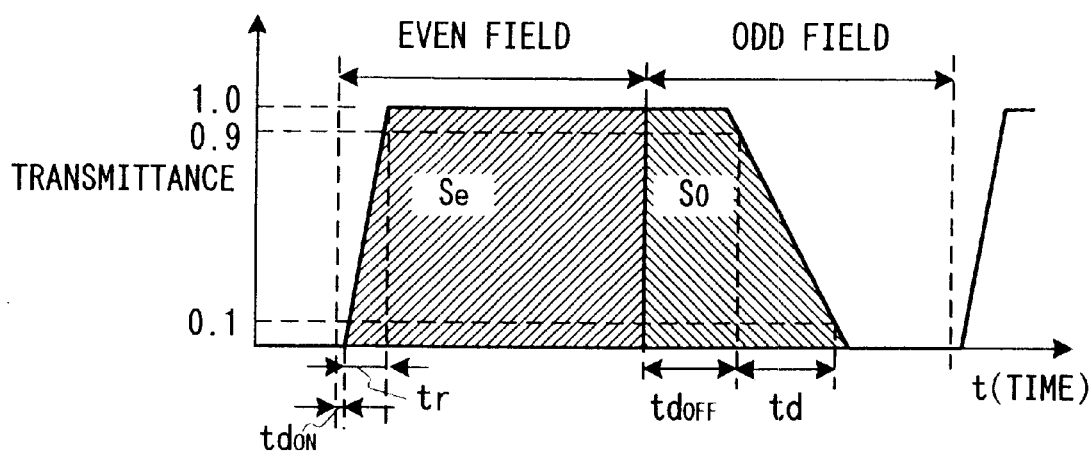
FIG.34 (b) PRIOR ART
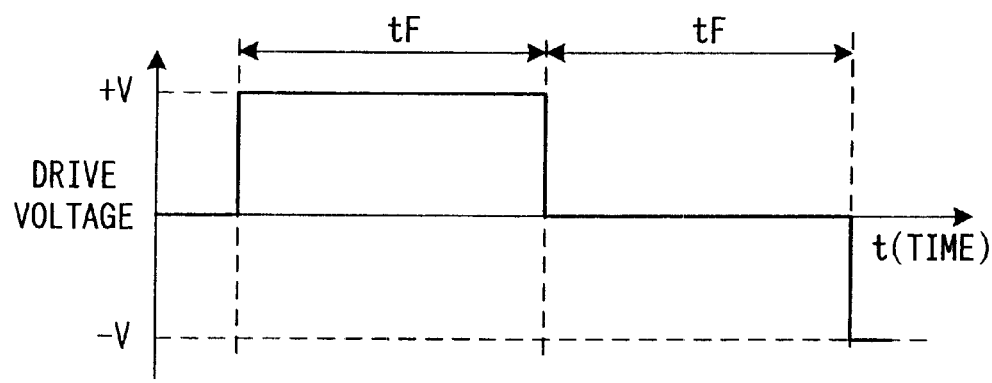

FIG.41

NORMAL DISPLAY

| Odd 1 | Even 1 | Odd 2 | Even 2 |
|---|---|---|---|

DOUBLE RATE DISPLAY

| Odd 11 | Odd 12 | Even 11 | Even 12 | Odd 21 | Odd 22 | Even 21 | Even 22 |
|---|---|---|---|---|---|---|---|

IMAGE DISPLAY USING WOBBLING

BACKGROUND OF THE INVENTION

The present invention relates to an image display for displaying images with image shift by wobbling.

Japanese Patent Disclosure No. 6-324320 discloses an image display, which comprises a vibrating means disposed on an optical path between a display element having a discrete pixel array and an observing position for vibrating the optical axis of light emitted from the display element in predetermined directions. In this display, odd and even field images are successively written in the same pixel of the display element for display, and in synchronism to the fields the vibrating means vibrates the optical axis of light from the display element for predetermined directions, that is, wobbles the display surface of the display element, thus spatially separating the odd and even field images from one another. In this way, equivalent pixels are displayed on a pixel-free black matrix portion of the display surface, thus improving the resolution.

FIG. 22 shows the construction of this prior art image display. The illustrated image display comprises a color liquid crystal panel (hereinafter referred to as LCD) 1 as a display element), having a backlight 1a and a color liquid crystal display element 1b and a vibrating means including a polarization converting element 2 and a double refractor 3 disposed one ahead of the other on the front surface side of the LCD 1. The LCD 1 has, for instance, one half the scanning lines of the NTSC, and as shown in a fragmentary plan view in FIG. 23, has delta arrays of R, G and B pixels. In FIG. 22, a reduced number of, i.e., several, scan lines are shown for the sake of the clarity of the drawing.

As the polarization converting element 2, a twist nematic liquid crystal shutter (hereinafter referred to as TN shutter) is usually used, which is relative inexpensive and is manufactured on the basis of an established technique. As shown in FIGS. 24(a) and 24(b), the TN shutter 2 includes a pair of polarizing members 6 having transparent electrodes 5 and a TN liquid crystal layer 7 sandwiched between the transparent electrodes 5. An AC power source 9 is connected between the pair transparent electrodes 5 via a switch 8. As shown in FIG. 24(a), with an AC voltage applied across the TN liquid crystal layer 7 by turning on the switch 8, the polarization of light incident on the polarization converting element 2 is transmitted without being rotated. As shown in FIG. 24(b), with no AC voltage applied across the TN liquid crystal layer 7 by switching off the switch 8, the polarization of the incident light is transmitted while it is rotated by 90 degrees.

The double reflector 3 is formed from an anisotropic crystal, such as rock crystal ($\alpha$-SiO$_2$), lithium niobate (LiNbO$_3$), rutile (TiO$_2$), calcite (CaCo$_3$), Chile nitre (NaNo$_3$) and YVO$_4$. As shown in FIG. 25, it transmits incident light of a first polarization as normal light, and transmits incident light of a second polarization at right angles to the first polarization as abnormal light. Denoting the thickness of the double refractor 3 in z-axis direction perpendicular to xy coordinates of the display surface of the color LCD 1, i.e., the direction of incidence of light beam by d and the angle of separation between the normal light and abnormal light by $\theta$, the normal and abnormal light beams emitted from the double reflector 3 are spatially separated by d×tan $\theta$.

Thus, with the crystallization axis 3a of the double refractor 3 set in a suitable direction, as shown in FIG. 26, by turning off the TN shutter 2 the polarized light is rotated in the TN shutter 2 by 90 degrees and transmitted therethrough as a second polarized light, and is then transmitted through the double refractor 3 as, for instance, abnormal light. In this way, as shown in FIG. 27, the pixels of the display surface of the color LCD 1 can be observed in black matrix positions obliquely upwardly rightward by substantially one half pixel pitch from the original pixel positions. As shown in FIG. 28, by turning off the TN shutter 2 the polarized light from the color LCD 1 is transmitted through the TN shutter 2 without being rotated but as the input first polarized light itself, and is transmitted through the double refractor 3 as normal light. In this case, the pixels of the display surface of the color LCD 1 can be observed in the original positions as shown in FIG. 23.

In the prior art image display as shown in FIG. 22, the properties of the TN shutter 2 and the double refractor 3 are utilized such that, while odd and even field images of the input image signal are successively displayed on the same pixel of the color LCD 1 under control of an image display control circuit 11, the voltage applied to the TN shutter 2 is on-off controlled fixedly by an TN shutter drive circuit 12 which constitutes a vibrating means. Thus, wobbling, i.e., changing of the pixel position observed through the double refractor 3 according to the direction of polarization of light transmitted through the TN shutter 2, is obtained to improve the resolution. More specifically, in the odd field the TN shutter 2 is held "off", and, as shown in FIG. 29, the observed pixel positions are shifted obliquely upwardly rightward by substantially one half pixel pitch from the original pixel positions (the pixel positions in this case being shown as Ro, Go and Bo). In the even field the TN shutter 2 is held "on", and, as shown in FIG. 30, the original pixel positions are restored as the observed pixel positions (the pixel positions in this case being shown as Re, Ge and Be). It is thus possible to permit observation of images with double the pixel number of the color LCD 1.

For the odd and even field images displayed on the color LCD 1, the image signal is sampled at timings different from each other by a time corresponding to the extent of image shift. More specifically, when displaying the odd field images, the timing of sampling of the image signal is delayed behind the timing of when displaying the even field images by a time corresponding to substantially one half pixel pitch. Also, since the color LCD 1 holds the hold image in display until it is re-written by the next field image, one of the pair electrodes of the TN shutter 2 is divided into a plurality of lines, for instance about 51 lines, while the other electrode is used as a common electrode. The voltage application is thus controlled by selecting the divided electrodes according to the timing of the line scanning of the color LCD 1.

However, according to various experiments and studies conducted by the inventor with the prior art image display adopting the wobbling as described above, it has been found that there are many problems. For example, the response characteristic in the rotation of the light from the TN shutter 2 constituting the vibration means has dependence on temperature and is deteriorated in the low temperature, thus sufficient resolution improvement can not be obtained.

FIGS. 31(a) and 31(b) are views for describing the response characteristics in the rotation of the polarized light in the TN shutter 2. Specifically, FIG. 31(a) shows the first polarized light transmittance, and FIG. 31(b) shows the drive voltage. It is assumed that a high frequency voltage is applied as the drive voltage. The TN shutter 2 has a rise response time $\tau_{ON}$ when the drive voltage is turned on and a fall response time $\tau_{OFF}$ when the drive voltage is turned off. Denoting the maximum and minimum first polarized light transmittances of the TN shutter 2 by Tm and To, respectively, the rise response time $\tau_{ON}$ is represented by the sum of a rise delay time $td_{ON}$ from the instant when the drive voltage is turned on till the instant when 10%, i.e., (To+0.1 (Tm−To)) is reached by the first polarized light transmittance after the commencement of behavior of the liquid crystal and a rise time tr from the instant of actual rising of the TN liquid crystal upon reaching of the 10% transmittance till the instant of reaching of 90% transmittance, i.e., (To+0.9(Tm−To). The fall response time, $\tau_{OFF}$, on the other hand, is represented by the sum of a fall delay time $td_{OFF}$ from the instant of commencement of the behavior of the liquid crystal when the drive voltage is turned off till the instant of transmittance fall down to 90% and a fall time td from the instant of actual falling of the TN liquid crystal upon the transmittance fall down to 90% till the instant of the transmittance fall down to 10% again.

In the above response characteristics, the rise time tr depends on the applied drive voltage, while the fall time td depends on material characteristics peculiar to the liquid crystal. These times tr and td as well as the rise and fall delay times $td_{ON}$ and $td_{OFF}$, also depend on temperature. Thus, the values of $td_{ON}$, tr, $td_{OFF}$ and td vary in dependence on temperature even by applying the same drive voltage to the same TN shutter 2. For example, the response rate which is assumed to be $td_{ON}$=0.5 ms, tr=1 ms, $td_{OFF}$=5 ms and td=5 ms, and hence $\tau_{ON}$=1.5 ms and $\tau_{OFF}$=10 ms, at 30° C., is better at 40° C. at which $td_{ON}$≈0 ms, tr≈5 ms, $td_{OFF}$=2 ms and td=3 ms, and hence $\tau_{ON}$≈0.5 ms and $\tau_{OFF}$=5 ms, and is worse at 10° C., at which $td_{ON}$=1 ms, tr=2 ms, $td_{OFF}$=8 ms and td=7 ms, and hence $\tau_{ON}$=3 ms and $\tau_{OFF}$=1.5 ms.

When the rise and fall response characteristics are bad particularly at low temperatures, the transmittance of one pixel of the TN shutter 2 to the first polarized light with the drive voltage as shown in FIG. 32(b) is as shown in, for instance, FIG. 32(a). Ideally, in the even field only the first polarized light should be transmitted for displaying the data (i.e., image signals Re, Ge and Be) thereof only in the original pixel positions (hereinafter also referred to as even lines). However, during the rise response time $td_{ON}$, the second polarized light is also transmitted. Therefore, the data of the first polarized light is also displayed in the shifted pixel positions (hereinafter referred to odd lines), at which the data (i.e., image signals Ro, Go and Bo) of the second polarized light are to be displayed. Likewise, during the fall response time $td_{OFF}$ both the first and second polarized light beams are transmitted, and data (i.e., image signals Ro, Go and Bo) which should be displayed only in the odd lines, are also displayed in the even lines, thus resulting in an observed image as shown in FIG. 33(b).

For the above reason, particularly at low temperature, at which the response characteristics are worse, due to residual light of the preceding field it is impossible to obtain sufficient resolution improvement by wobbling. In addition, since the temperature dependency of the response characteristics usually pronounced during the fall response time $\tau_{OFF}$ compared to the rise response time $\tau_{ON}$, a problem of contrast reduction is posed. In the case of FIGS. 32(a) to 32(c) opposite polarity drive voltages are alternately applied to the TN shutter 2 in successive even fields. However, it is also possible to apply a high frequency drive voltage in each voltage application period.

The calculation of the contrast will now be described with reference to FIGS. 34(a) to 34(b), which are enlarged-scale views of FIGS. 32(a) and 32(b). In FIG. 34(a), the response characteristic in the rotation of the polarized light is approximated by a straight line plot for the sake of simplifying the calculation. In FIG. 34(a) denoting the areas of the even and odd fields of the response characteristic by Se and So, respectively, the contrast Cont is given as:

$$Cont=(Se-So)/(Se+So) \quad (1)$$

Denoting the time of one field by tF, the areas Se and So are given as:

$$Se=tF-\tau_{NO}+(1/2)tr \quad (2)$$

and $$So=td_{OFF}+(1/2)td. \quad (3)$$

The contact Cont is thus given as:

$$Cont=(tF-\tau_{ON}-td_{OFF}+(1/2)(tr-td))/(tF-\tau_{ON}+td_{OFF}+(1/2)(tr+td)) \quad (4)$$

By substituting tF=16.67 ms (i.e., 1/60 s) as each of the values at 30° C., 40° C. and 10° C. noted above into the equation (4), we have $$Cont.[30° C.]=0.353$$

$$Cont.[40° C.]=0.649$$

and $$Cont.[10° C.]=0.121,$$

it was found that the contrast is reduced with reducing temperature.

Such contrast reduction with temperature changes is also pronounced in the case when image to be displayed on the color LCD 1 is preliminarily corrected in the odd and even fields to compensate the resolution reduction due to the response characteristic in the TN shutter 2.

Where the response characteristic and the temperature dependency of the TN shutter 2 have been described, where the color LCD 1 is used as display element as shown in FIG. 22, its constituent, for instance a TFT LCD, also has a response characteristic. Therefore, when the TN shutter 2 is on-off controlled for shuttering as the same timings as the timings of switching of the odd and even field images to be displayed on the LCD, even in the case that the TN shutter 2 has an ideal response characteristic and selectively transmits the first and second polarized light beams at the same timings as the image switching timings, residual light of the preceding field is also generated due to the response characteristic of the LCD, In this case, sufficient improvement of the resolution by wobbling can no longer be obtained, thus giving rise to the problem of the contrast reduction.

FIGS. 35(a) and 35(b) are views for describing the response characteristic of a positive type Crossnicol LCD. Specifically, these Figures show the light blocking factor of the LCD and the drive voltage applied thereto when white at a certain brightness and black are displayed alternately for each field on a pixel of the LCD. Referring to FIG. 35(a), denoting the rise delay time from the instant when the drive voltage is turned on till the instant when the light blocking factor of the pixel reaches 10% by $Td_{ON}'$, the subsequent rise time till the reaching of a light blocking factor of 90% by tr', the rise response time represented by the sum of $td_{ON}'$ and tr' by $\tau_{ON}'$ the fall delay time from the instant when the drive voltage is turned off till the instant when the light blocking factor is reduced down to 90% by $td_{OFF}'$ the subsequent fall time till the instant when the light blocking factor is reduced down to 10% by td' and the fall response time represented by the sum of $td_{OFF}'$ and td' by $\tau_{OFF}'$, with an LCD using TN liquid crystal we have $td_{ON}'$=2 ms, tr'=10 ms, $td_{OFF}'$=2 ms and td'=10 ms, and hence $\tau_{ON}'$=12 ms and $\tau_{OFF}'$=12 ms. The response characteristic is not so satisfactory.

Here, the contrast Cont' obained as in the case of FIGS. 34(a) and 34(b) by setting the field time to be tF=16.67 ms and the areas in the even and odd fields to be Se' and So' is Cont.'=0.160.

With such unsatisfactory response characteristic of the LCD, by turning on and off the TN shutter 2 in synchronism to the field the contrast is deteriorated even when the TN shutter 2 has an ideal characteristic.

As descried before, in the case of using an LCD as the display element, the use of DC as the drive voltage leads to characteristic deterioration due to internal electro-chemical changes. Usually, therefore, an AC drive method is adopted, in which a high frequency voltage is applied or the polarity of the applied voltage is inverted for every field.

Considering now a pixel in driving the TN shutter by wobbling, the polarity inversion of the applied drive voltage for every field results in a deviated pixel display position. For example, the applied voltage is always positive (or negative) in the odd fields and always negative (or positive) in the even fields, in which the pixel is displayed in the original pixel position. However, as shown in FIG. 36 which shows the waveform of image signal when a pixel is considered, the center potential Vc (shown by phantom line) of the applied AC drive voltage and the common electrode voltage Vcom (shown by dashed line) of the LCD do not coincide with each other, but may, for instance, be Vc>Vcom. Therefore, when image data of the same brightness is to be displayed in the successive fields, even though the absolute value Va of the applied drive voltage is the same in the odd and even fields of the image signal, with Vb=(Vc−Vcom) the absolute value of the actual drive voltage applied to the LCD is Vo=(Va+Vb) in the odd field and Ve=(Va−Vb) in the even fields, that is, the drive voltage absolute value Ve in the odd fields is greater than the drive voltage absolute value Ve in the even fields.

Due to the deviation of Vc and Vcom from each other, the inter-field drive voltage waveform is no longer symmetrical. Thus, the brightness is changed even when the same brightness image is displayed. For example, in the case of an LCD of the positive type, in which the display is the blacker the higher the absolute applied voltage value, with Vo>Ve as noted above, the display is dark in the odd fields and bright in the even fields. In other words, image irregularities are generated in the wobbled image due to repeated generation of dark and bright fringes in the image, thus deteriorating the image quality.

In the meantime, a binocular display such as a head mounted display (hereinafter referred to as HMD) may use the image display as shown in FIG. 22 as each of the displays for the left and right eyes. In such a binocular system, if the direction of pixel shift by wobbling is the same obliquiely rightward direction, a frequency space as shown in FIG. 37 can be obtained concerning the resolution. Specifically, when the wobbling is not executed, the frequency space, in which an LCD having a delta pixel array can display images, is an area as defined by ±Px and ±Py. With horizontal and vertical pixel pitches ax and by of the delta pixel array, are area is defined by (Px=1/ax) and (Py=1/by).

When a pixel shift is executed in this binocular system by wobbling in the same obliquely rightward direction by, for instance, one half pixel pitch in both the horizontal and vertical directions, the frequency space is now an area defined by ±Px' and ±Py' in the obliquely rightward direction. Compared to the case when the wobbling is not executed, this area is broader in correspondence to the pixel pitch reduction to one half. In this case, however, the frequency area is increased in the sole obliquely rightward direction noted above. Therefore, the images displayed on both the let and right image displays, which are viewed as a merged iamge, can not be observed as natural image.

SUMMARY OF THE INVENTION

The present invention was made in view of the various problems described above, and it has an object of providing an image display capable of effective improvement in the wobbling effect reduction due to the temperature dependency of the response characteristic of the vibrating means and displaying images at a high resolution.

Another object of the present invention is to provide an image display capable of effective improvement in the wobbling effect reduction due to the responce characteristic of the display elements and displaying images at a high resolution.

A further object of the present invention is to provide a image display capable of effective prevention of image irregularities and displaying images at a high resolution and of a high image quality.

A still further object of the present invention is to provide a binocular image display with a left and a right image display capable of observation of natural merged images from the two image displays by displaying high resolution images thereon by wobbling.

According to an aspect of the present invention, there is provided an image display comprising a display element having a display surface with a regular array of a plurality of pixels, an image display control means for displaying different images different in successive fields on the display element, and a vibrating means for vibrating the optical axis of light emitted from the display surface in predetermined directions in synchronism to the switching of images by the image display control means, wherein the image display further comprises a temperature control means for the temperature of the vibrating means.

With the provision of the temperature of the vibrating means, it is possible to effectively improve the wobbling effect reduction due to the temperature dependency of the response characteristic of the vibrating means.

The temperature control means includes a heating means for heating the vibrating means for improving the optical axis vibration response characteristic of the vibrating means at low temperatures.

According to another aspect of the present invention, there is provided an image display comprising a display element having a display surface with a regular array of a plurality of pixels, an image display control means for displaying different images different in successive fields of the display element, and a vibrating means for vibrating the optical axis of light emitted form the display surface in predetermined directions in synchronism to the switching of images by the image display control means, wherein the vibrating means vibrates the optical axis in accordance with the response characteristic of the display element.

Since the vibrating means for wobbling is adapted to vibrate the optical axis according to the response characteristic of the display element, it is possible to effectively improve the wobbling effect reduction due to the response characteristic of the display element and thus display high resolution images.

The vibrating means includes a polarized light converting means and a driving means for driving the polarized light converting means in accordance with the response characteristic of the display element.

According to other aspect of the present invention, there is provided an image display comprising a display element having a display surface with a regular array of a plurality of pixels, an image display control means for displaying different images different in successive fields on the display element, and a vibrating means for vibrating the optical axis of light emitted from the display surface in predetermined directions in synchronism to the switching of images by the image display control means, wherein the image display control means includes a polarity inverting means for inverting the polarity of an image signal applied to the display pixels of the display element for every two instants of image switching.

According to still other aspect of the present invention, there is provided an image display comprising a display element having a display surface with a regular array of a plurality of pixels, an image display control means for displaying different images different in successive fields on the display element, and a vibrating means for vibrating the optical axis of light emitted from the display surface in predetermined directions in synchronism to the switching of images by the image display control means, wherein the image display control means includes a polarity inverting means for inverting the polarity of an image signal applied to the display pixels of the display element for each frame.

Since the image display control means for displaying different images different in successive fields on the display element includes a polarity inverting means for inverting the polarity of an image signal applied to the display pixels of the display element for every two instants of image switching or for each frame, even when the center potential of the AC drive voltage and the common electrode potential on the display element fail to coincide with each other in the polarity inversion, it is possible to effectively prevent the generation of image irregularities and display high resolution and high image quality images by wobbling.

According to further aspect of the present invention, there is provided an image display comprising a left and a right display elements each having a display surface with a regular array of a plurality of pixels, a left and a right display control means for displaying different images different in successive fields on the display surfaces of the respective display elements, and a left and a right vibrating means for vibrating the optical axes of light emitted from the display surfaces in predetermined directions in synchronism to the switching of images by the image display control means, wherein the left and right vibrating means vibrate the optical axes in different directions.

In binocular observation image display in which wobbling is executed in both the left and right image displays, the left and right vibrating means for wobbling are adapted to vibrate the optical axes in different directions, and it is thus possible to permit observation of high resolution images obtained as a result of wobbling as natural images.

The left and right vibrating means vibrate the optical axes in symmetrical directions with respect to a vertical axis.

According to still further aspect of the present invention, there is provided an image display comprising a display element having a display surface with a regular array of a plurality of pixels, an image display control means for displaying different images different in successive fields on the display element, and a vibrating means or vibrating the optical axis of light emitted from the display surface in predetermined directions in synchronism to the switching of images by the image display control means, the image display including a twist nematic liquid crystal shutter (TN shutter), a double refractor and an TN shutter drive circuit for on-off controlling the TN shutter, and the temperature control means permitting the temperature of the TN shutter to be held at a fixed temperature.

The temperature control means is one of a sheet-like heater disposed around the TN shutter, a transparent electrode of the TN shutter as a heater, a Peltier element, and a transparent heater pattern for generating heat on a glass substrate of the TN shutter. The image display further comprisies a cooling means thermally coupled to the TN shutter. The temperature control means further controls temperature of the display elements.

According to other aspect of the present invention, there is provided an image display comprising a display element having a display surface with a regular array of a plurality of pixels, an image display control means for displaying different images different in successive fields on the display element, and a vibrating means for vibrating the optical axis of light emitted from the display surface in predetermined directions in synchronism to the switching of images by the image display control means, the image display including a twist nematic liquid crystal shutter (TN shutter), a double refractor and an TN shutter drive circuit for on-off controlling the TN shutter in responsive to a synchronizing signal of an image signal, wherein the TN shutter is controlledf on the basis of the display element and the TN shutter.

The TN shutter is controlled such that the transmittance to two polarized lights are substantially 50% at the instant when the time tA has passed from the instant of the field switching, tA being one half the arithmetic mean of the rise time from the instant when the light blocking factor is 0% till the instant of reaching of 100% light blocking factor.

The image display further comprises, a field detecting circuit for generating a field synchronizing signal on the basis of the synchronizing signal from the display element, a first and a second delayed signal generating circuits for delaying the field synchronizing signal by a first and a second times, respectively, on the basis of response characteristic of the TN shutter, TN shutter drive signal generating circuit for generating, in response to receipt the outputs of the delayed signal generating circuits, a TN shutter drive signal, the TN shutter being controlled such that the transmittance to two polarized lights are substantially 50% at the instant when the time tA has passed from the instant of the field switching, tA being one half the arithmetic mean of the rise time from the instant when the light blocking factor is 0% till the instant of reaching of 100% light blocking factor.

The two outputs of the first and a second delayed signal generating circuits are used as a set signal and a reset signal for generating the TN shutter drive signal.

Other objects and features will be clarified from the following description with reference to attached drawings.

BRIEF DESCRIPTION OF THE DRAWINGS

FIG. 1 shows a construction of a first embodiment of the image display according to the present invention;

FIG. 2 shows a construction of a second embodiment of the image display according to the present invention;

FIGS. 4(a) to 4(g) show drawings for explaining the operation of the second embodiment;

FIGS. 7(a) and 7(b) show drawings for explaining a modified example of the second embodiment;

FIGS. 10(a) to 10(e) show waveforms for explaining the operation of the thirs embodiment;

FIGS. 16(a) and 16(b) show drawings for explaining pixel shift direction of the right and left image display in the fourth embodiment;

FIGS. 33(a) and 33(b) show drawings for describing problems to be solved in the prior art image display;

FIGS. 34(a) to 34(b) show enlarged-scale views of FIGS. 32(a) and 32(b);

FIGS. 38–41 show drawings for explaining modification example of the third embodiment according to the present invention.

PREFERRED EMBODIMENTS OF THE INVENTION

Figure 3A:
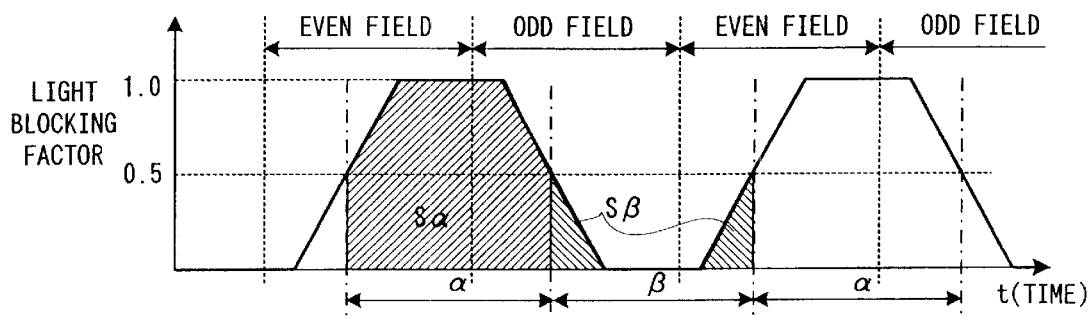
FIGS. 3(a) and 3(b) show drawings for explaining the response characteristic of colour LCD shown in FIG. 2.

Preferred embodiments of the present invention will now be described with reference to the drawings.

FIG. 1 schematically shows the construction of an embodiment of the image display according to the present invention. This image display, like the one shown in FIG. 22, comprises a color LCD 1 as a display element, having a backlight 1a and a color liquid crystal display element 1b, and a polarization converting element including a TN shutter 2 and a double refractor 3 disposed one ahead of the other on the front surface side of the LCD 1. Like the prior art image display as described before, odd and even field images of the input image signal are successively displayed on the same pixel under control of an image display control circuit 11. At the same time, the TN shutter 2 is on-off controlled by a TN shutter drive circuit 12 in synchronism to a synchronizing signal of the image signal for wobbling, i.e., changing the pixel positions observed via the double refractor 3 according to the direction of the polarized light transmitted through the TN shutter 2. The TN shutter 2, the double refractor 3 and the TN shutter drive circuit 12 constitute a vibrating means, and the image display control circuit 11 constitutes an image display control means.

In this embodiment, a sheet-like heater 21 is disposed as a heating means around the TN shutter 2 for improving the wobbling effect reduction due to the temperature dependency of the response characteristic of the TN shutter 2. The heater 21 is connected to a heater drive control circuit 22 for heating the TN shutter 2 by supplying a predetermined current thereto. A temperature sensor 23 is disposed in the neighborhood of the TN shutter 2 for on-off controlling the current supply to the heater 21 from the heater drive control circuit 22 according to its output. In this way, the temperature of the TN shutter 2 is held at a fixed temperature, which is in a range not exceeding the permissible temperature on the high temperature side guaranteed for the system and permits a satisfactory response characteristic to be obtained, for instance 40° C. The heater 21, a heater drive control circuit 22, and the temperature sensor 23 constitutes a temperature control means in the vibrating means.

By permitting the temperature of the TN shutter 2 to be held at a fixed temperature, at which it is possible to obtain a satisfactory response characteristic by the heater 21, it is possible to always display high resolution images by wobbling without being adversely affected by ambient temperature changes. Image display at a satisfactory resolution also can always be obtained without adverse effects of ambient temperature changes in the case of preliminarily compensating the images displayed on the color LCD 1 for the odd and even fields.

While in the above embodiment the sheet-like heater 21 is disposed around the TN shutter 2 for heating the same, it is also possible to have the transparent electrodes themselves of the TN shutter 2 also function as a heater, or use a Peltier element as a heater or provide, a transparent heater pattern for generating heat on a glass substrate of the TN shutter 2. Furthermore, in lieu of newly providing a heater or like heat generator, it is possible to transfer the heat generated in the backlight 1a of the color LCD 1 via a satisfactory heat-conductive member to the TN shutter 2 or dispose a high heat generation rate circuit in the neighborhood of the TN shutter 2 for heating the same. In these cases, for preventing the excessive heating, a cooling means such as a Peltier element is provided such as being thermally coupled to the TN shutter 2, and is controlled to a predetermined temperature according to the temperature of the TN shutter 2 as detected by a temperature sensor.

While in the above embodiment the TN shutter 2 is heated, it is also possible to heat the color LCD 1 as well as the TN shutter 2. This arrangement permits improvement of the response characteristic of the color LCD 1 as well, thus permitting further improvement of the overall resolution and contrast by wobbling. The overall response characteristic of the unit as the combination of the color LCD 1 and the TN shutter 2 is considered to be the product of and inferior to the response characteristics of the individual components. In this case, it is impossible to obtain a resolution and a contrast as desired. This problem can be solved by heating each of the two components to a predetermined temperature such as to obtain satisfactory response characteristics.

FIG. 2 schematically shows the construction of a second embodiment of the present invention. In this embodiment, for improving the wobbling effect reduction due to the response characteristic of the color LCD 1, with the response characteristics of the color LCD 1 and the TN shutter 2 taken into considerations a TN shutrter drive means 31 on-off controls the TN shutter 2 according to a synchronizing signal of an image signal supplied to it from the image display control circuit 11. In this way, wobbling is obtained, that is, the pixel positions observed via the double reflector 3 are changed according to the direction of polarized light transmitted through the TN shutter 2.

Where the color LCD 1 is of the positive Crossnicole type, for instance, in this embodiment the TN shutter 2 is controlled as follows. In the response characteristic of the LCD, denoting one half the arithmetic mean of the rise time from the instant when the light blocking factor is 0%, i.e., white (minimum applied voltage) till the instant of reaching of 100% light blocking factor, i.e., black (maximum applied voltage) by tA, the control is executed such that, the transmittance of the TN shutter 2 to the first polarized light is substantially 50%, that is, the transmittance to the second polarized light is also substantially 50%, at the instant when the time tA has passed from the instant of the field switching.

Figure 3B:
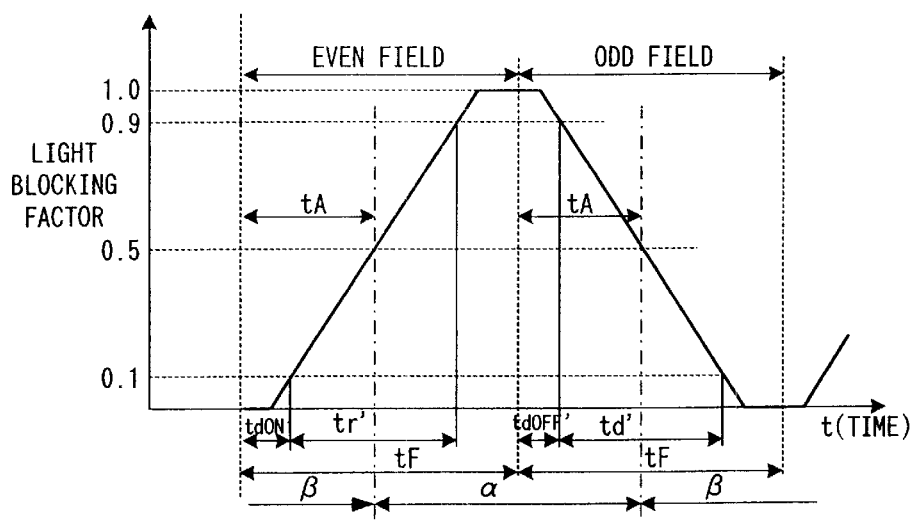

Specifically, the TN shutter 2 is controlled such as to obtain a transmittance response characteristic of the color LCD 1 as shown in FIG. 3(a) when white and black are displayed in alternate fields on a pixel in the LCD. As shown, the TN shutter 2 is on-off controlled such that at the instant when the light blocking factor of the LCD ids substantially 50%, the transmittance of the TN shutter 2 to the first polarized light is also substantially 50%. In this way, images are displayed mainly at the original pixel positions in period $\alpha(=tF)$ and mainly at the shifted pixel positions in period $\beta(=tF)$. Assuming now that the TN shutter 2 has an ideal response characteristic, transmitting the sole first polarized light in the period $\alpha$ and the sole second polarized light in the period $\beta$, the contrast will be calculated with reference to FIG. 3(b), which is obtained by enlarging the scale of FIG. 3(a). In this case, the light blocking factor areas $S\alpha$ and $S\beta$ of the LCD in the periods $\alpha$ and $\beta$, respectively, are $$S\alpha \approx 3(tr'+td')/8+((tF-td_{ON}'-tr')+td_{OFF}') \quad (5)$$

and $$S\beta \approx (tr+td')/8 \quad (6)$$

Figure 35A:
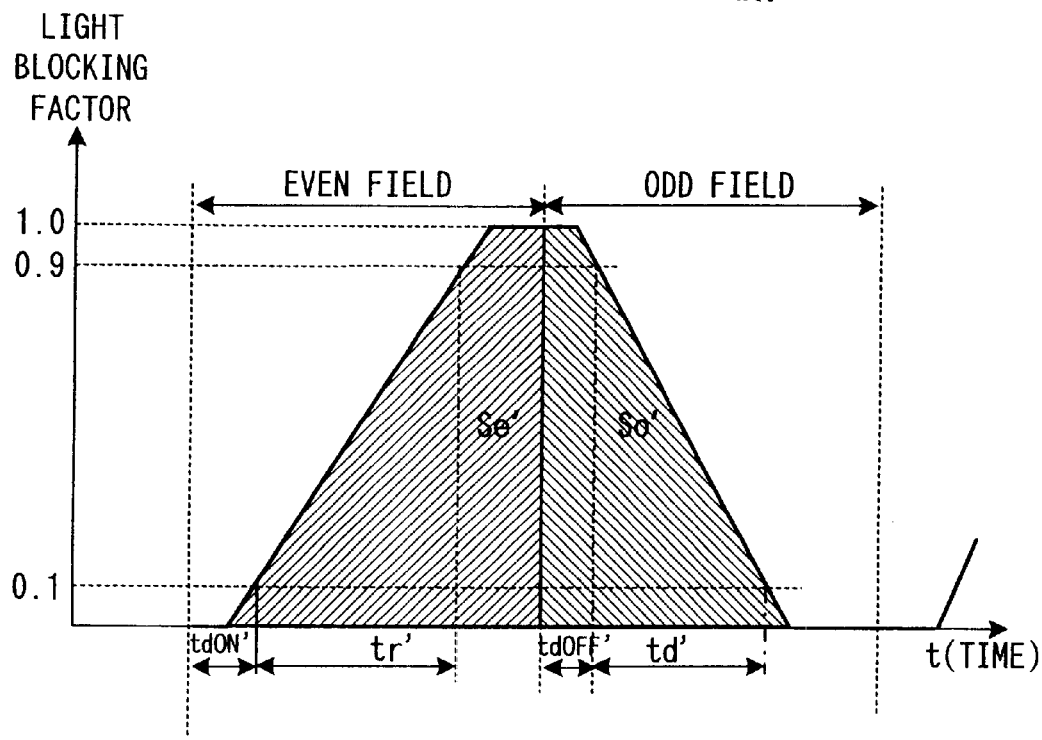
FIGS. 35(a) and 35(b) are views for describing the response characteristic of a positive type Crossnicol LCD.
Figure 35B:
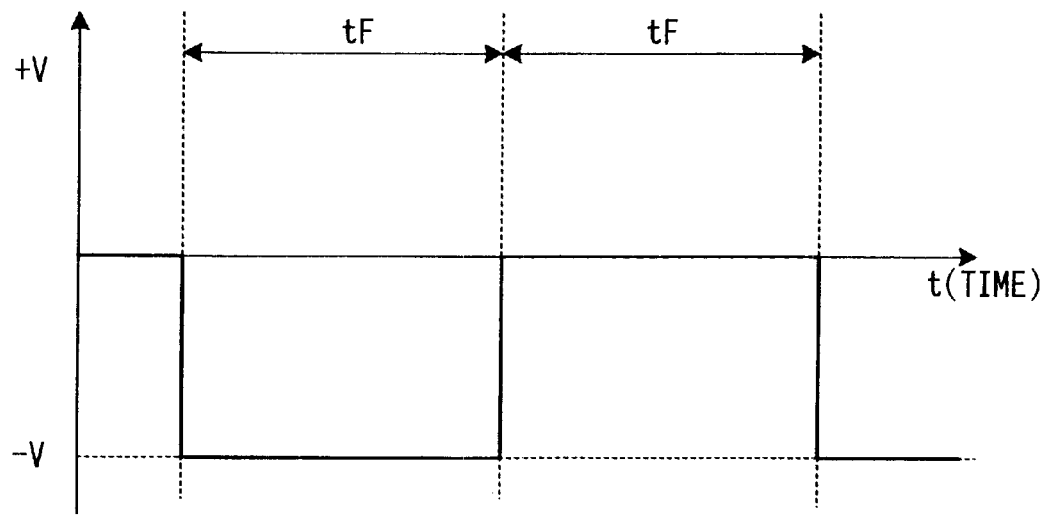
Figure 36:
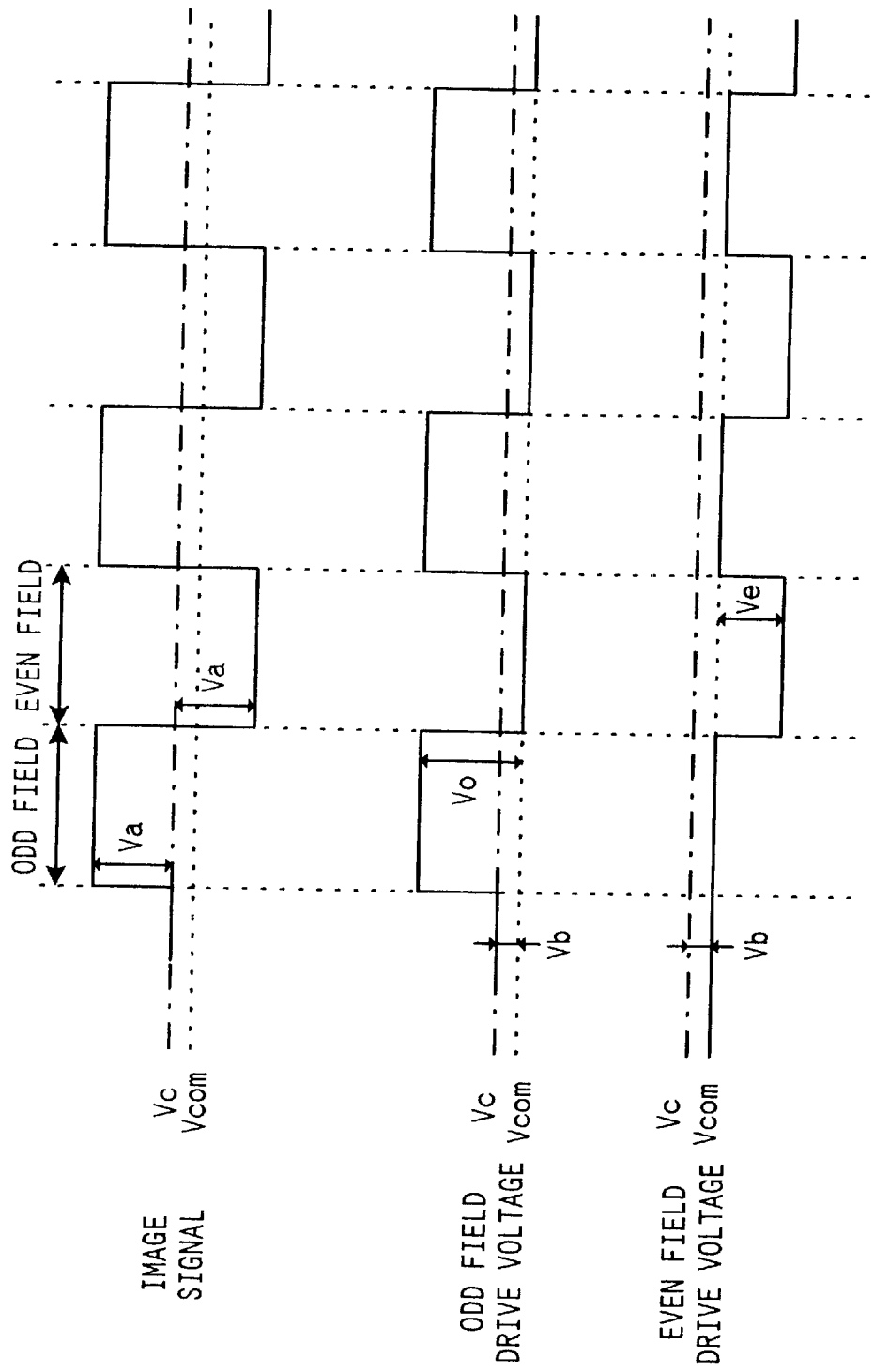
FIG. 36 shows a drawing representing the polarity of image sinal applied to an image signal in the prior art image display.
Figure 37:
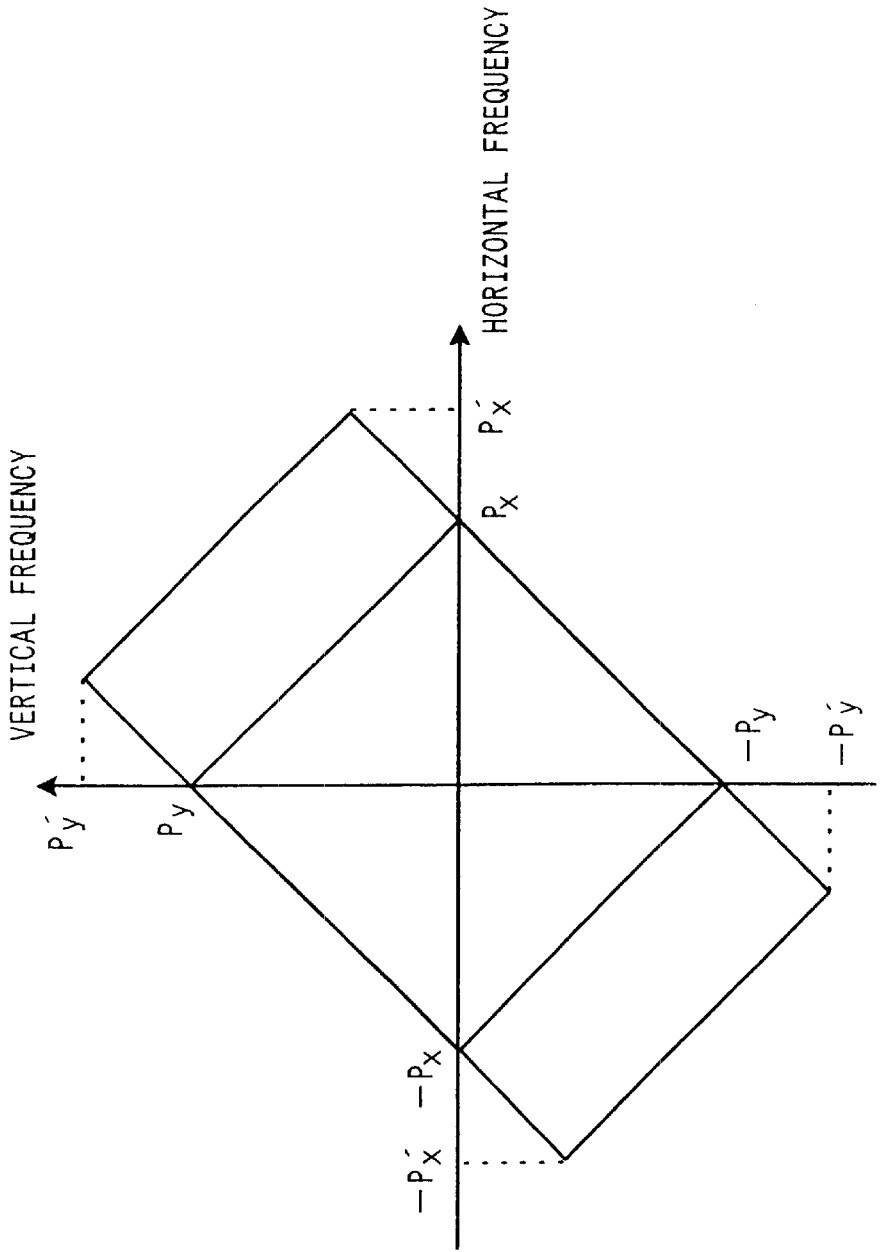
FIG. 37 shows a drawing representing the resolution in frequency space in the prior art image display.

Like the case of FIGS. 35(a) and 35(b), by substituting $td_{ON}'=2$ ms, $tr'=10$ ms, $td_{OFF}'=2$ ms and $td'=10$ ms and also substituting $tF=16.67$ ms, we have $$S\alpha=16.67$$

and $$S\beta=2.5.$$

Thus, the contrast Cont. is $$Cont.=(S\alpha-S\beta)/(S\alpha+S\beta)\approx 0.7.$$

Figure 31:
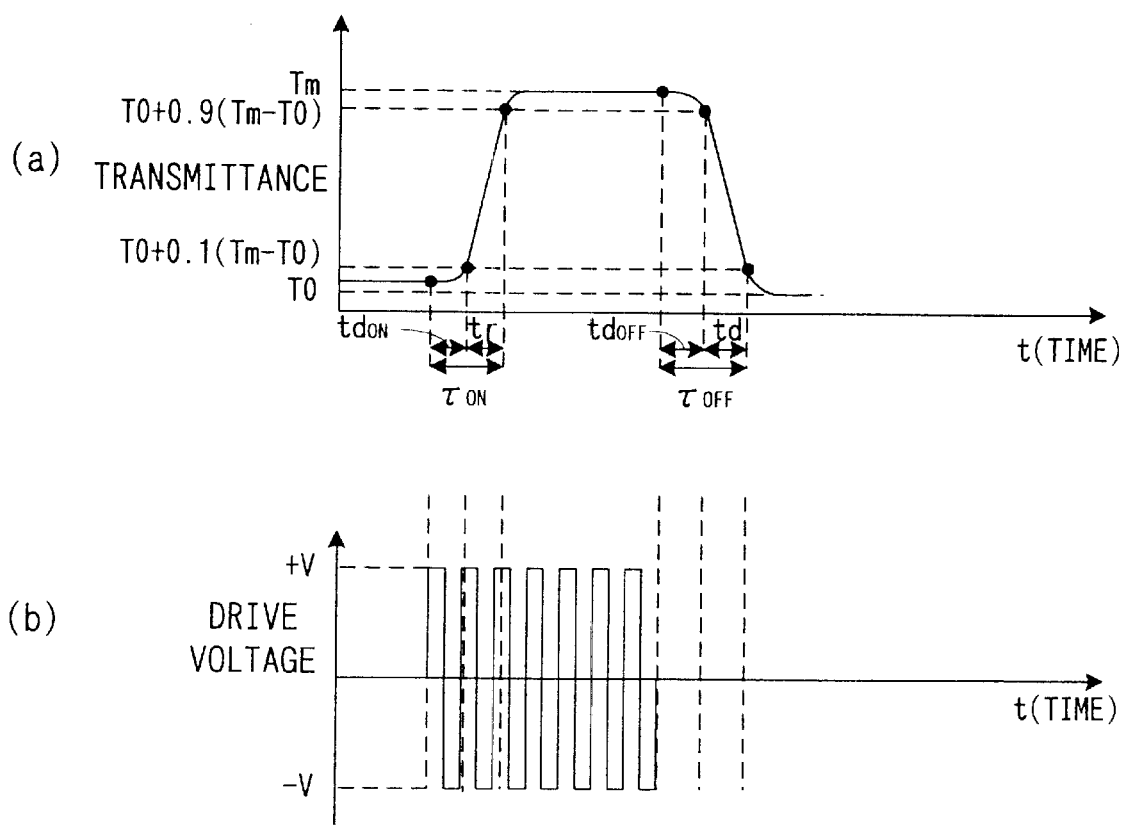
FIGS. 31(a) and 31(b) are views for describing the response characteristics in the rotation of the polarized light in the TN shutter in FIG. 22.
Figures 32A, 32B:
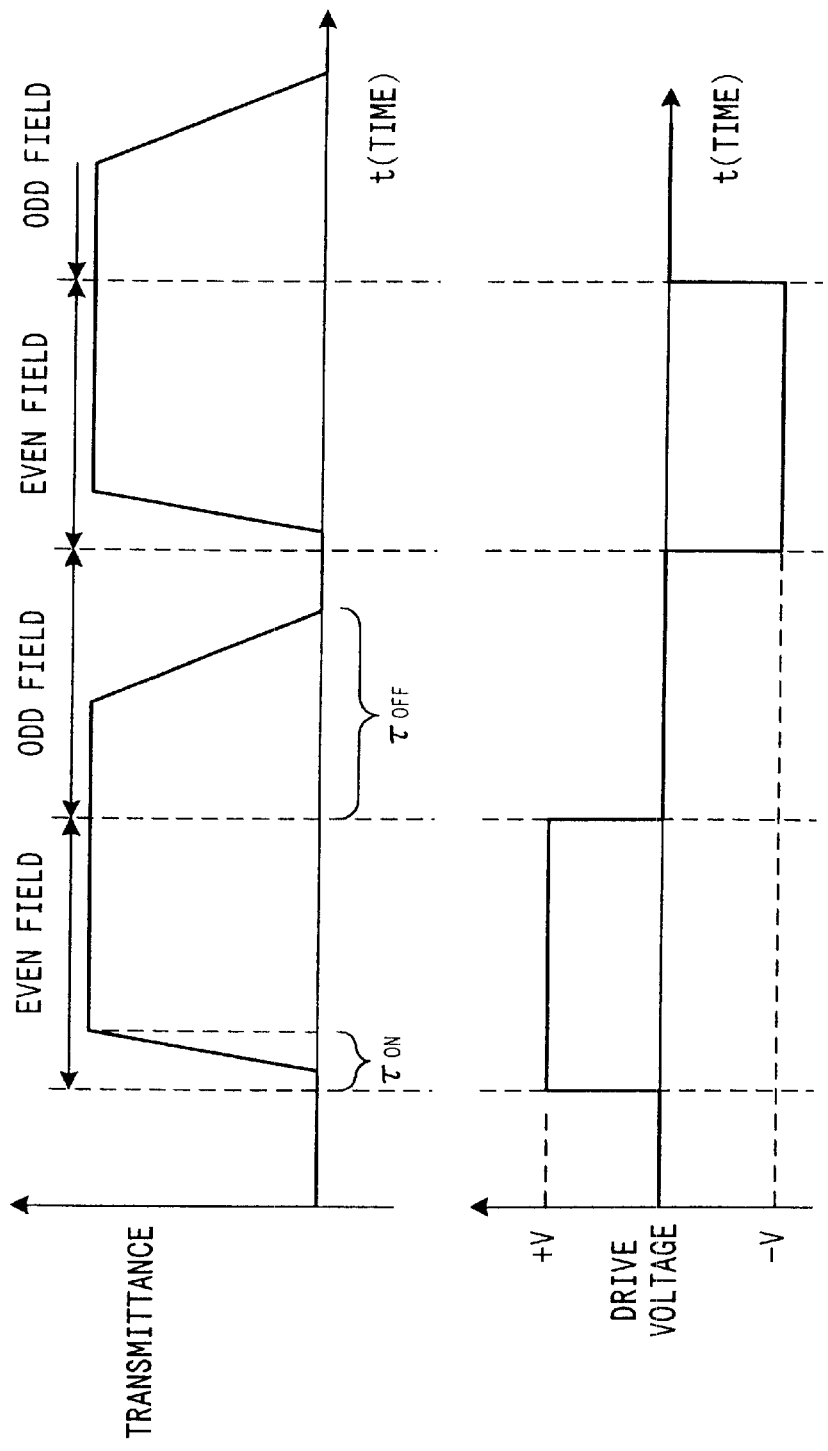
FIGS. 32(a) and 32(b) show the first polarized light transmittance of the TN shutter and on/off timings of the drive voltage, respectively.

Actually, however, the TN shutter 2 has the response characteristic as described before in connection with FIGS. 31(a) and 31(b). Therefore, the above contrast can not be obtained. To minimize the reduction of the contrast due to the response characteristic of the TN shutter 2, in this embodiment the TN shutter 2 is driven with the response characteristic thereof taken into considerations such that its transmittance to the first polarized light is substantially 50% when the above time tA has passed since the field switching instant. To this end, the TN shutter driving means 31 includes a field detecting circuit 32 for generating a field synchronizing signal from the synchronizing signal provided from the image display control circuit 11, delayed signal generating circuits 33 and 34 for delaying the field synchronizing signal by times $\tau 1$ and $\tau 2$, respectively, and a TN shutter drive signal generating circuit 35 for generating a TN shutter drive signal from the delayed field synchronizing signals and applying a shutter drive voltage to the TN shutter 2 in synchronism to the TN shutter drive signal.

Figure 4A:
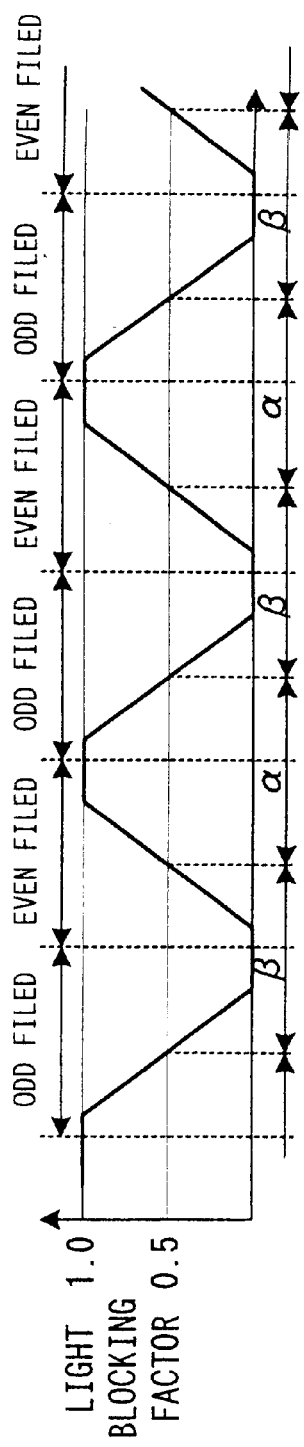
Figure 4B:
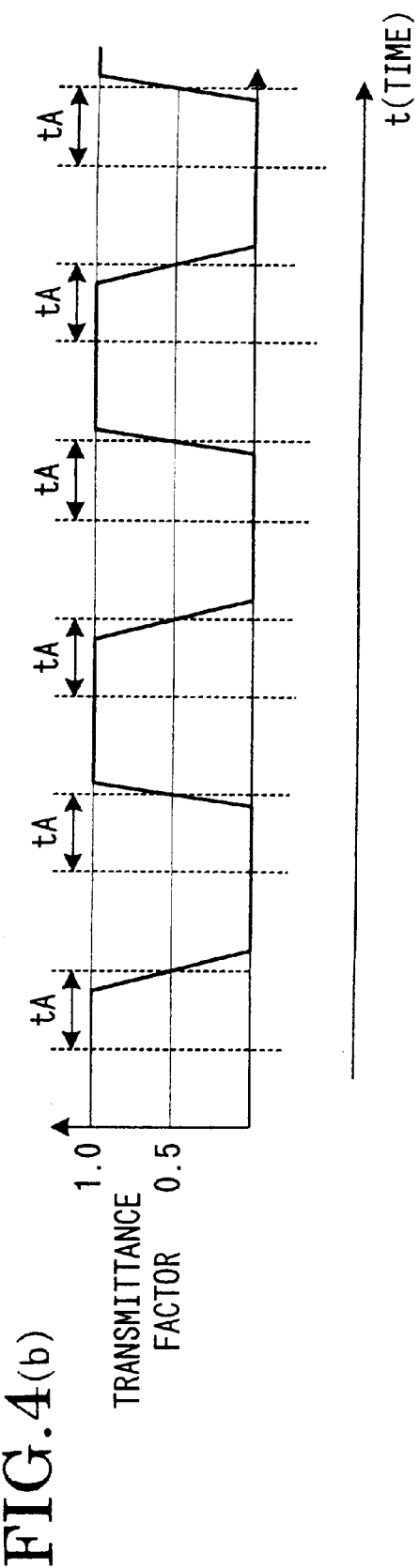

The operation of this embodiment will now be described with reference to FIGS. 4(a) to 4(g). FIG. 4(a), like FIG. 3(a), shows the transmittance response characteristic of the color LCD 1 when displaying white and black in alternate fields on a pixel of the LCD. FIG. 4(b) shows the transmittance response characteristic of the LCD to the first polarized light. The field detecting circuit 32 generates a field synchronizing signal as shown in FIG. 4(c) according to the synchronizing signal from the image display control circuit 11. The delayed signal generating circuits 33 and 34 delay this field synchronizing signal by times $\tau 1$ and $\tau 2$, respectively, as shown in FIGS. 4(d) and 4(e), according to the response characteristic of the TN shutter 2 itself. Receiving the outputs of the delayed signal generating circuits 33 and 34, the TN shutter drive signal generating circuit 35 uses, for instance, the output of the delayed signal generating circuit 33 as a set signal and the output of the delayed signal generating circuit 34 as a reset signal for generating a TN shutter drive signal as shown in FIG. 4(f) and applying a shutter drive voltage as shown in FIG. 4(g) to the TN shutter 2 in synchronism to the TN shutter drive signal. While in the case of FIG. 4(g) opposite polarity DC drive voltages are applied in successive even fields, it is also possible to apply a high frequency drive voltage in each voltage application period.

In this case, the time tb from the instant when the shutter drive voltage is turned on till the instant when the transmittance to the first polarized light becomes substantially 50% and the duty ratio df of the shutter drive voltage are set to be $$tb = td_{ON} + t/2 \qquad (7)$$

and $$df = (tF + (td_{ON} - td_{OFF}) + (tr - td)/2)/(2 \cdot tF) \qquad (8)$$

The delay times $\tau 1$ and $\tau 2$ in the delayed signal generating circuits 33 and 34 are thus controlled to be $$\tau 1 = tF - td_{ON} - (1/2)tr + tA \qquad (9)$$

and $$\tau 2 = 2tF - td_{OFF} - (1/2)td + tA \qquad (10)$$

Figure 5A:
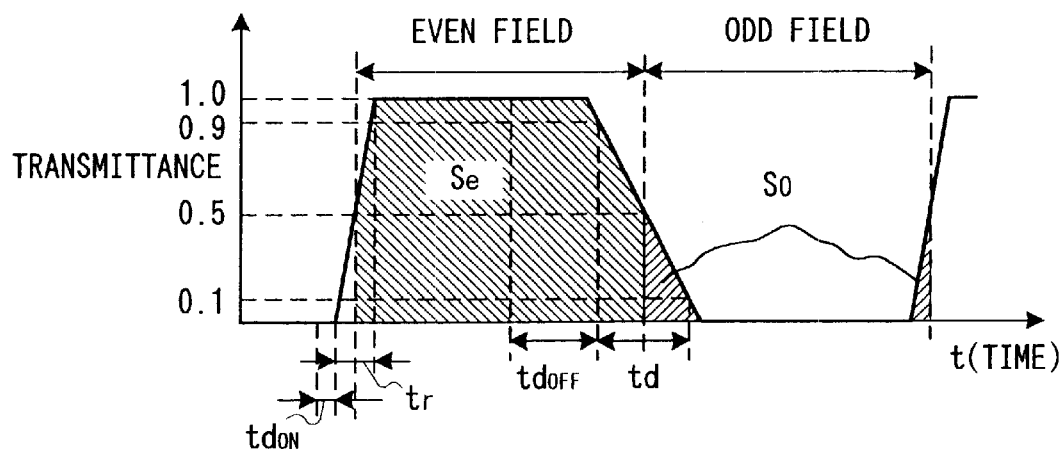
FIG. 5 shows a drawing for explaining the transmittance of the TN shutter to the first polarized light.

Thus, as shown in an enlarged scale in FIG. 5, the areas Se and So in the even and odd fields concerning the transmittance of the TN shutter 2 to the first polarized light are, respectively, $$Se = tF - (5/32)tr - (5/32)td \qquad (11)$$

and $$So = (5/32)/tr + (5/32)td \qquad (12)$$

Assuming the response characteristic of the color LCD 1 to be ideal, the contrast Cont. obtained as a result of the wobbling is thus $$Cont. = (16tF - 5(tr + td))/(16tF) \qquad (13)$$

By substituting tF=16.67 ms (1/60 s) and the values of tr and td described before in connection with FIGS. 31(a) and 31(b), for instance tr=1 ms and td=5 ms at 30° C., the contrast Cont. is $$Cont. = 0.8875.$$

Figure 22:
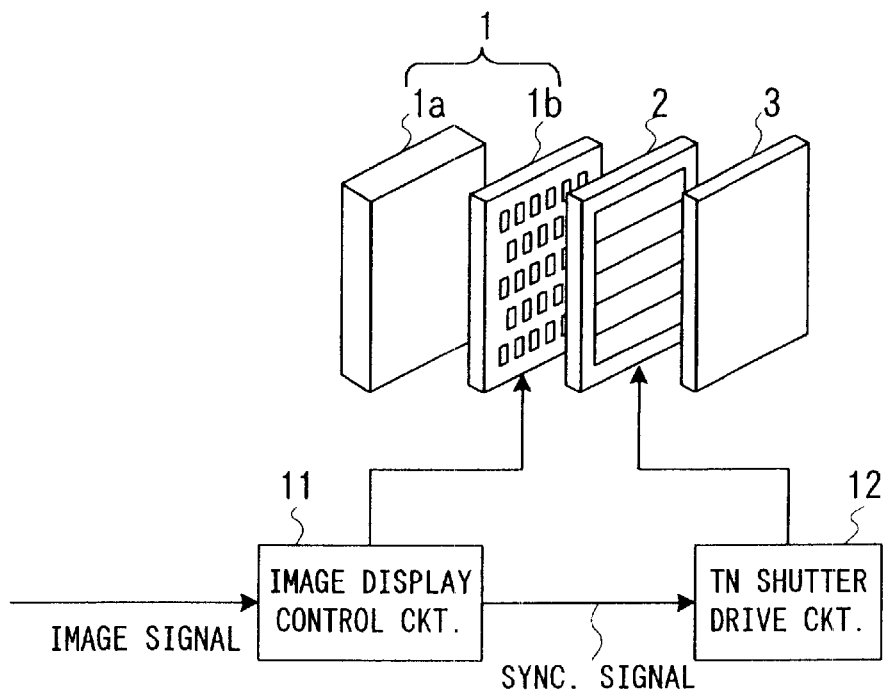
FIG. 22 shows a construction of this prior art image display.
Figure 23:
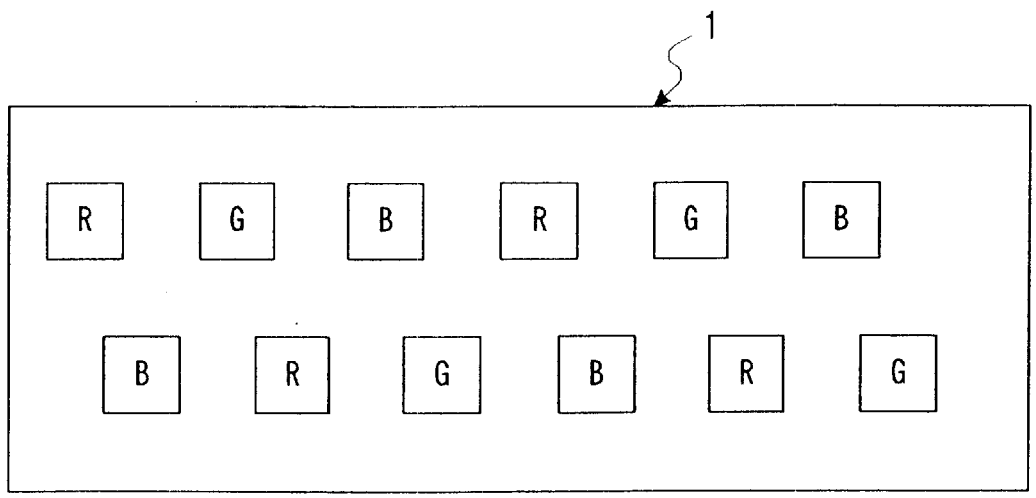
FIG. 23 shows a partial plan view representing image pixel arrangement of the color LCD shown in FIG. 22.
Figure 24A:
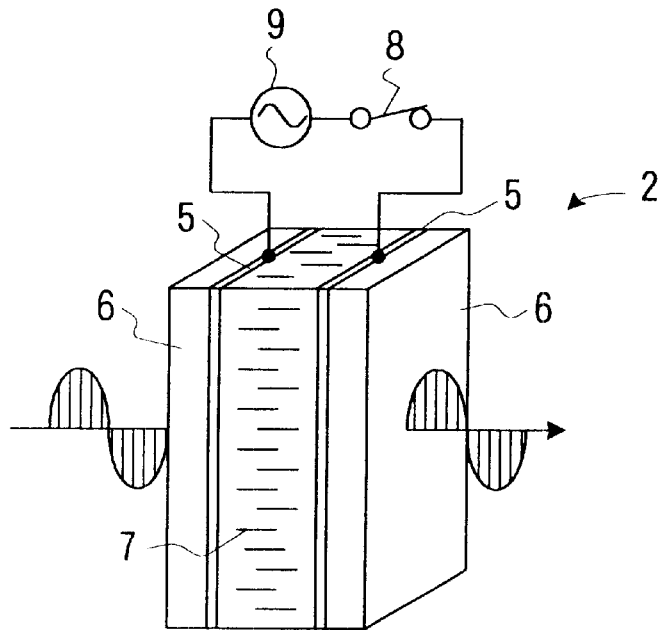
FIGS. 24(a) and 24(b) drawings for describing the operation of the TN shutter shown in FIG. 22.
Figure 24B:
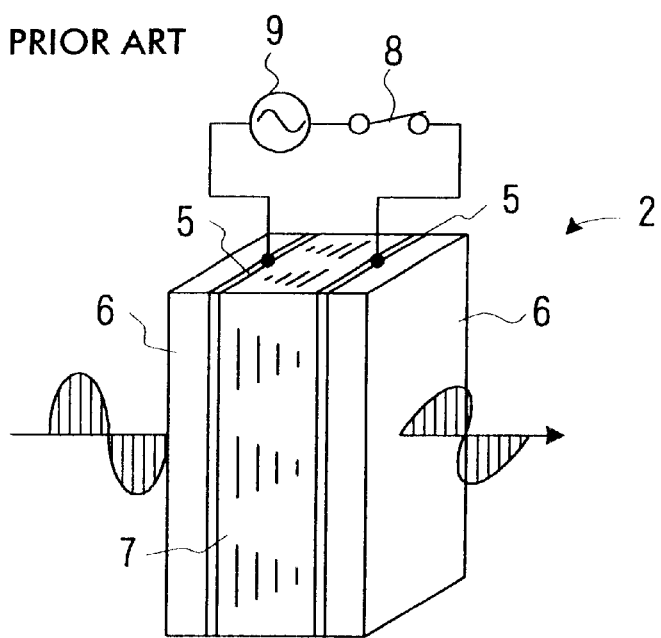
Figure 25:
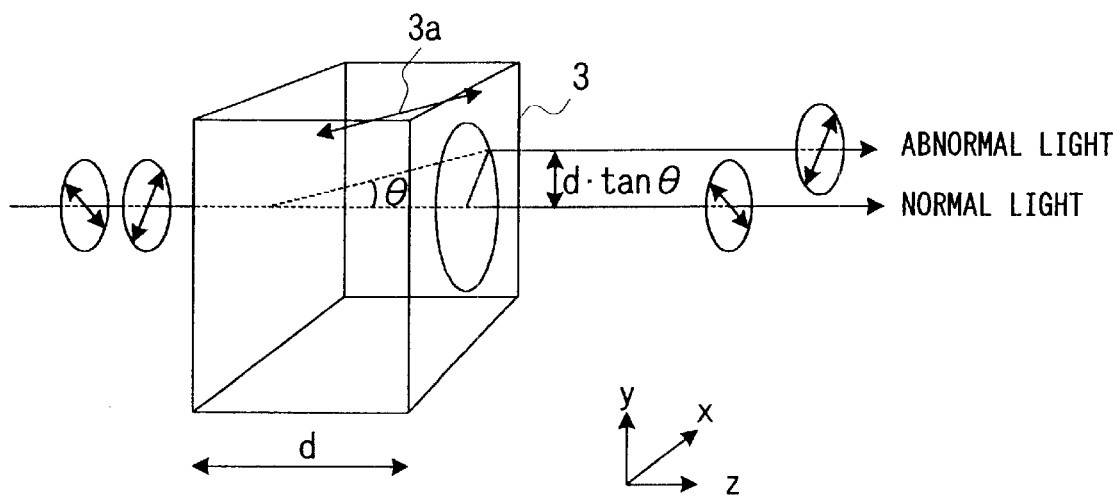
FIG. 25 shows a drawing for describing the operation of double refractor.
Figure 26:
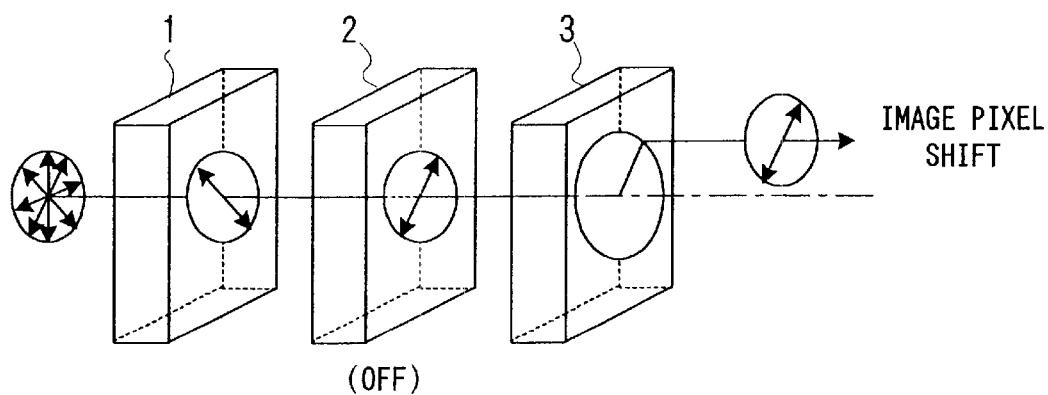
FIG. 26 shows a drawing,illustrating the polarization for the image pixel shift in a prior art image display.
Figure 27:
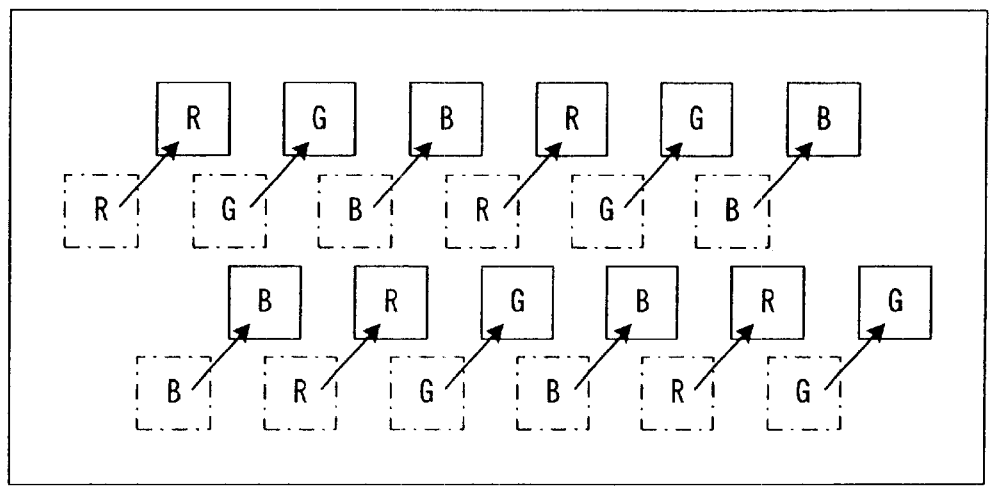
FIG. 27 shows observed image pixel positions in the image pixel shift state shown in FIG. 26.
Figure 28:
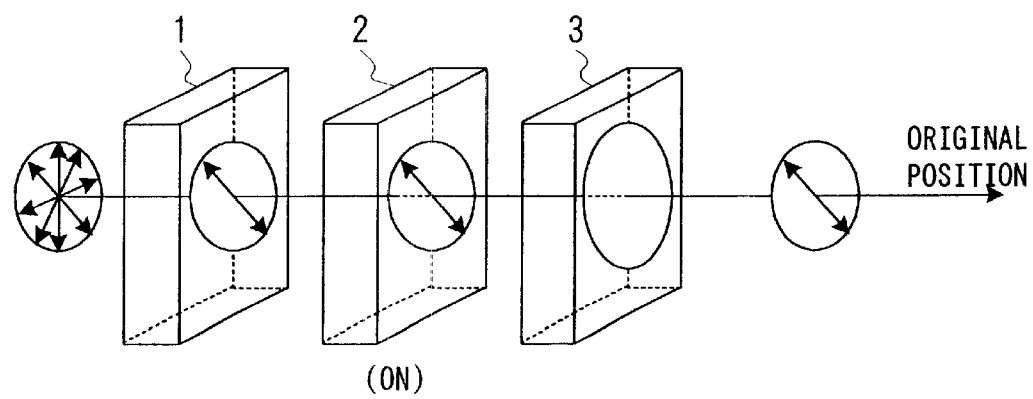
FIG. 28 shows a drawing illustrating the polarization without image pixel shift in the prior art image display.
Figure 29:
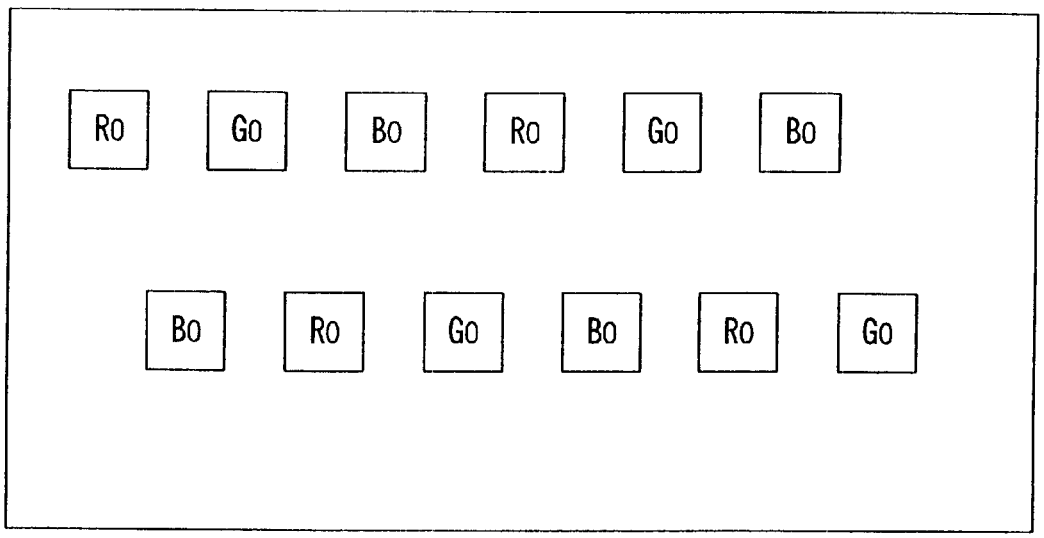
FIG. 29 shows the observed image pixel in the odd field in the prior art image display.
Figure 30:
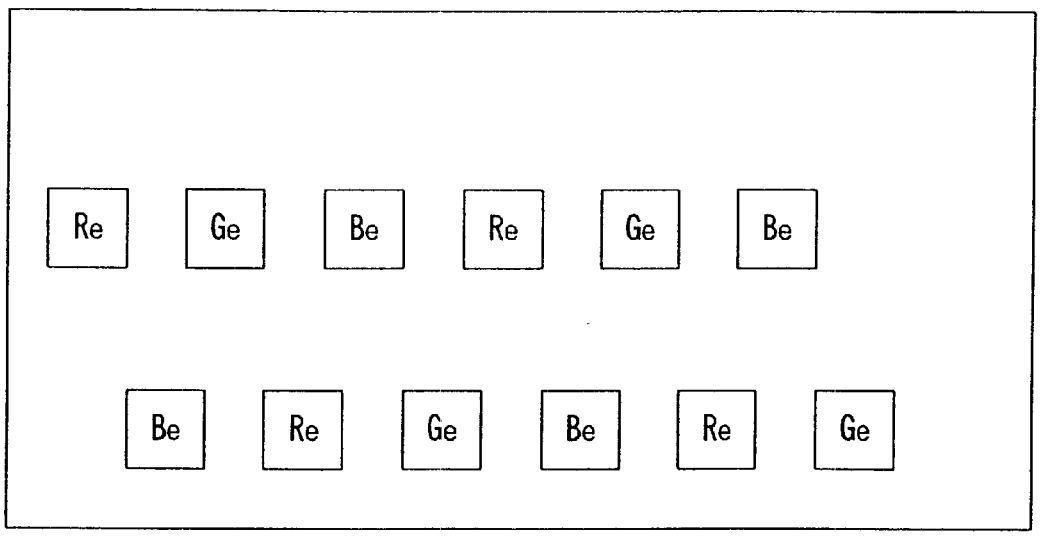
FIG. 30 shows the observed image pixel in the even field in the prior art image display.

It will thus be seen that a contrast improvement by about 53% can be obtained compared to the prior art image display shown in FIG. 22.

Figure 6:
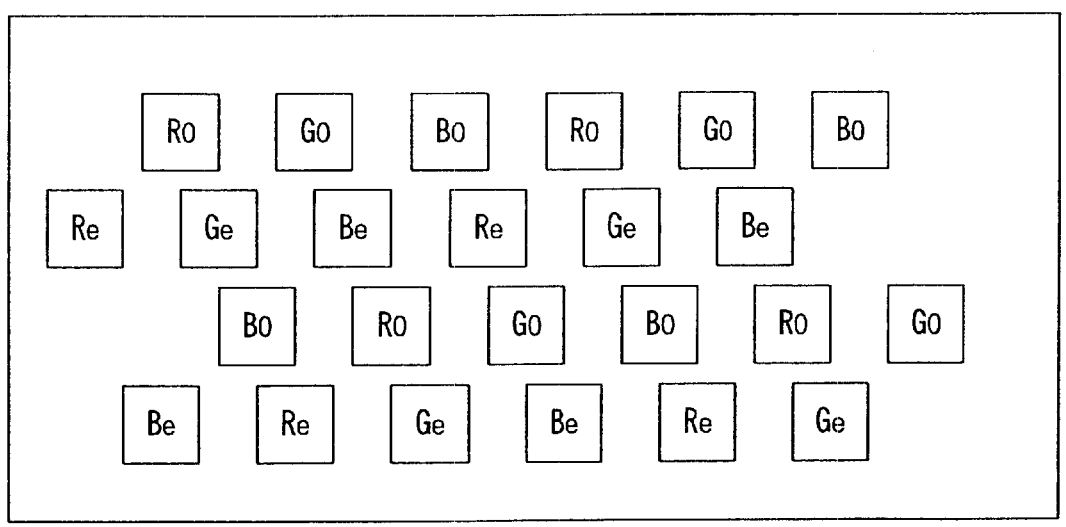
FIG. 6 shows observed image pixels of display surface of the color LCD in the second embodiment.

As shown above, by controlling the timings and duty ratio of shuutering of the TN shutter 2, at the timing not in the simultaneously timed relation to the field switching but at the timing after the lapse of one half tA of the arithmetic mean of the rise and fall response times of the transmittance of the color LCD 1 (in the case of the positive type Crossnicole), such that the transmittance of the shutter to the first polarized light is substantially 50%, it is possible to minimize the reduction of the contrast due to the response characteristics of the LCD and the TN shutter 2. That is, it is possible to minimize the simultaneous display of the same image signal in both the odd and even lines. Consequently, as shown in FIG. 6, it is possible to effectively display, in the odd fields, odd field image signals Ro, Go and Bo in the odd lines, i.e., the shifted pixel positions, and, in the even fields, even field image signals Re, Ge and Be in the even lines, i.e., the original image positions. Thus sufficient improvement is achieved. In this embodiment, the TN shutter 2, the double refractor 3 and the TN shutter drive means 31 constitute a vibrating means. Also, the TN shutter 2 constitutes a polarized light conversion element, and the field detecting circuit 32, the delayed signal generating circuits 33 and 34 and the TN shutter drive signal generating circuit 35 constitute a drive means.

In the construction shown in FIG. 2, one of the opposite side electrodes of the TN shutter 2 is divided for a plurality of lines, and thus the TN shutter 2 may be on-off controlled for each corresponding line electrode in the timed relation to the line scanning of the color LCD 1. In this case, it is possible to obtain the best resolution of the area corresponding to each line electrode by controlling the shutter for each line electrode in synchronism to the corresponding central pixel line scanning of the LCD 1, i.e., with a further delay time of tF/2 from the instant of the image signal switching for the central line electrode. Of course, where one of the opposite side electrodes of the TN shutter 2 is not divided like the other side electrode, it is also possible to obtain the best resolution in a central part of the displayed image by controlling the shutter with a further delay time of tF/2 provided from the image signal switching instant and thus in synchronism to the central pixel line scanning of the LCD.

Figure 8A:
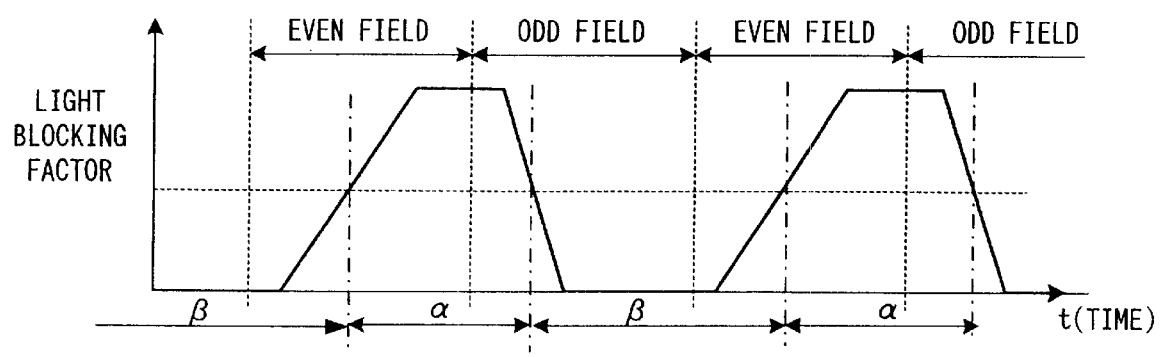
FIGS. 8(a) and 8(b) show drawings for explaining another modified example of the second embodiment.

It is further possible to on-off control the TN shutter 2 in other ways than described above. For example, it is possible to control the shutter such that the transmittance thereof to the first polarized light is substantially 50% when the transmittance of the color LCD 1 becomes substantially 50% in both of the transmittance rise and fall response characteristics of the LCD. In this case, the shutter may be on-off controlled such that its transmittance to the first polarized light is substantially 50% at the instant after a delay time of $(td_{ON}' + tr'/2)$ from the instant of switching from the odd to the even field of the image signal and likewise at the instant after a delay time of $(td' + td'/2)$ from the instant of switching from the even to the odd field.

Where the color LCD 1 has a response characteristic as shown in FIG. 3(a), i.e., where its rise and fall response times $\tau_{ON}'$ and $\tau_{OFF}'$ are the same, like the above embodiment the times $\alpha$ and $\beta$ are the same, and hence the time of display at the original pixel positions and that at the shifted pixel positions are the same. However, depending on the color LCD 1 or the display brightness, the rise response time $\tau_{ON}'$ may be shorter than the fall response time $\tau_{OFF}'$ as shown in FIG. 7(a), or the former may be longer than the latter as shown in FIG. 8(a). Even in such a case, it is possible to display images mainly at the original image positions for the time $\alpha$ and mainly at the shifted pixel positions for the time $\beta$ by on-off controlling the TN shutter 2 such that the transmittance of the TN shutter 2 to the first polarized light becomes substantially 50% when the light blocking factor of the LCD also becomes substantially 50%. Thus, in the case of FIG. 7(a) $\alpha > \beta$, and in the case of FIG. 8(a) $\alpha < \beta$, that is, in these cases the display times at the original pixel positions and at the shifted pixel positions are different.

Figure 8B:
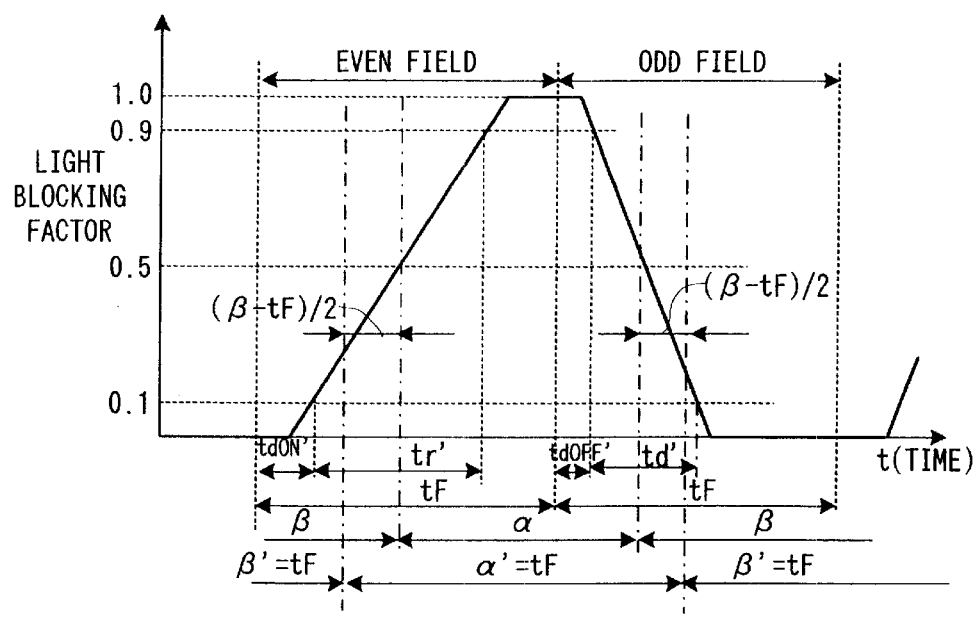

In the cases of FIGS. 7(a) and 8(a), it is possible to on-off control the TN shutter 2 such that the display times at the original and shifted pixel positions are the same. More specifically, in the case of FIG. 7(a), as shown in an enlarged scale in FIG. 7(b), at the rising of the response characteristic of the color LCD 1 the timing when the transmittance of the TN shutter 2 to the first polarized light becomes substantially 50% (as shown by double-dash phantom line) is delayed by $(\alpha - tF)/2$ from the instant when the light blocking factor of the LCD becomes substantially 50% (as shown by single-dash line), and at the falling of the response characteristic of the LCD it is advanced by $(\alpha-tF)/2$ from that instant, thus obtaining $\alpha'=\beta tF$. In the case of FIG. 8(a), as shown in an enlarged scale in FIG. 8(b), at the rising of the response characteristic of the LCD the timing when the transmittance of the TN shutter 2 to the first polarized light is substantially 50% (as shown by double-dash line) is advanced by $(\beta-tF)/2$ from the instant when the light blocking factor of the LCD becomes substantially 50% (as shown by single-dash line), and at the falling of the response characteristic of the LCD it is delayed by $(\beta-tF)/2$ from that instant to obtain $\alpha'=\beta'=tF$. For further contrast improvement, the images displayed on the color LCD 1 may be corrected such that the odd field images are low in brightness compared to the even field images in the case of FIG. 7(b) and that conversely the even field images are low in brightness compared to the odd field images in the case of FIG. 8(b).

It is still further possible to on-off control the TN shutter 2 in ways other than described above. For example, where the color LCD 1 is of the positive type Crossnicle, transmittance response characteristic of the shutter may be controlled such that the transmittance to the first polarized light is substantially 50% after the lapse of one half the arithmetic mean of the rise time from white up to the mid point value of the gray scale and the fall time from black down to the gray scale mid point value. Furthermore, in the case of FIG. 2 the delayed signal generating circuits 33 and 34 may be constructed such that they are capable of controlling the delay times $\tau 1$ and $\tau 2$ as desired, thus permitting the setting of the on-off timings of the TN shutter 2 by the observer as desired.

Moreover, as described before in connection with the first embodiment, the color LCD 1 and the TN shutter 2 may be held at a fixed temperature for the removal of the adverse effects of the temperature dependency of the response characteristics of the color LCD 1 and the TN shutter 2.

Figure 9:
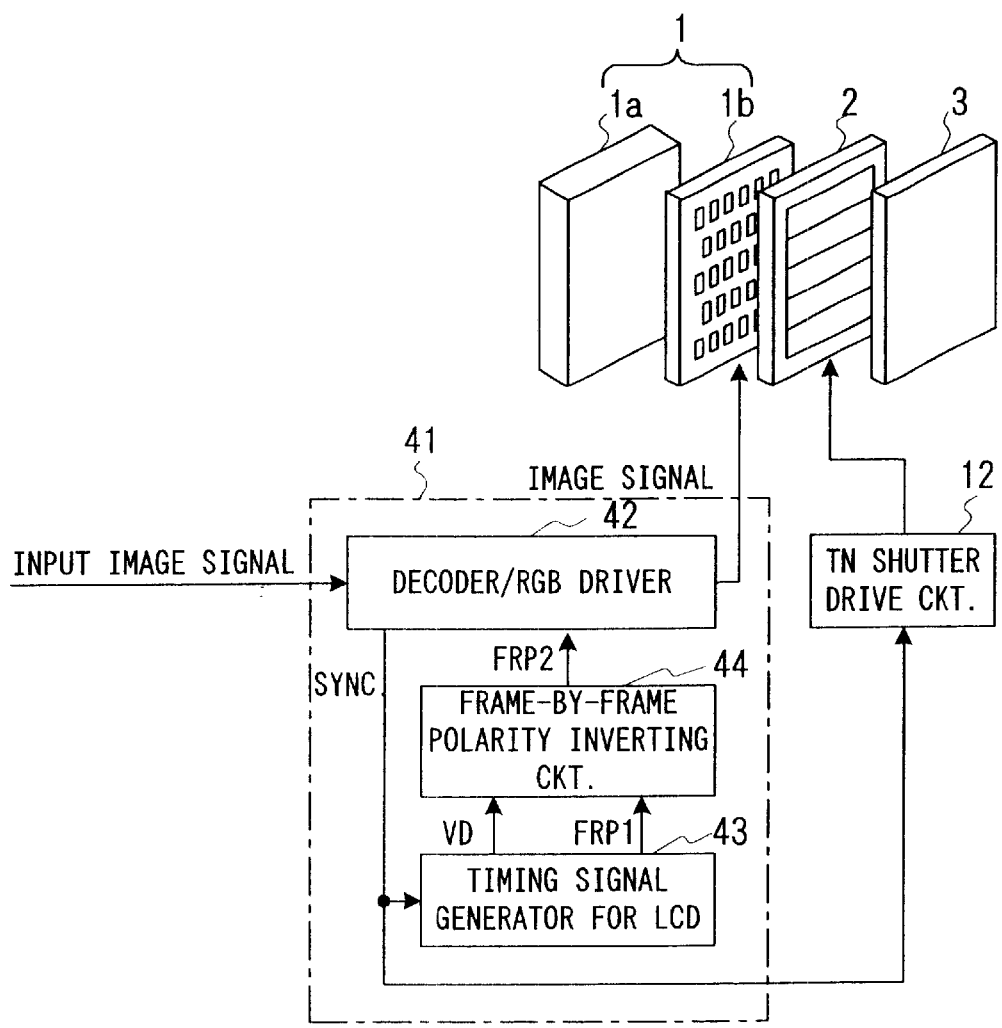
FIG. 9 shows a construction of a third embodiment of the image display according to the present invention.
Figure 19A:
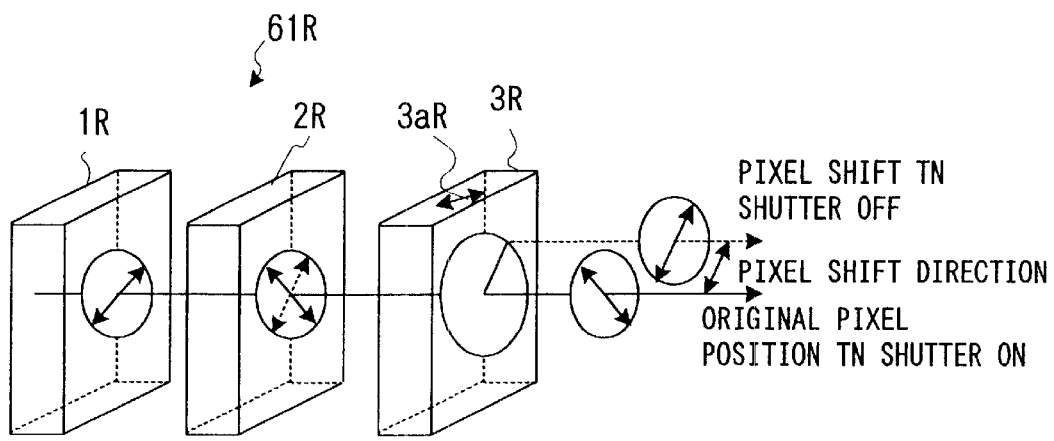
FIGS. 19(a) and 19(b) show drawings representing a third construction of the right and left image display in the fourth embodiment.

FIG. 9 schematically shows the construction of a third embodiment of the present invention. In his embodiment, image irregularities generated when driving the color LCD 1 by polarity inversion are effectively prevented, thus permitting display of high quality images by wobbling. Specifically, this embodiment comprises an image display control means 41, which includes a decoder/RGB driver 42, a timing signal generator (TG) 43 for the LCD and a frame-by-frame polarity inverting circuit 44. The decoder/RGB driver 42 separates a synchronizing (SYNC) signal from an input image signal, and supplies the SYNC signal to the timing signal generator 43, the timing signal generator 43 generates, according to the SYNC signal, a vertical synbchronizing signal VD as shown in FIG. 19(a) and an AC drive inversion timing signal FRP1 as shown in FIG. 10(b), with the polarity inverted for the odd and even lines in each field and also for every field, and supplies these signals to the frame-by-frame polarity inverting circuit 44.

Figure 11:
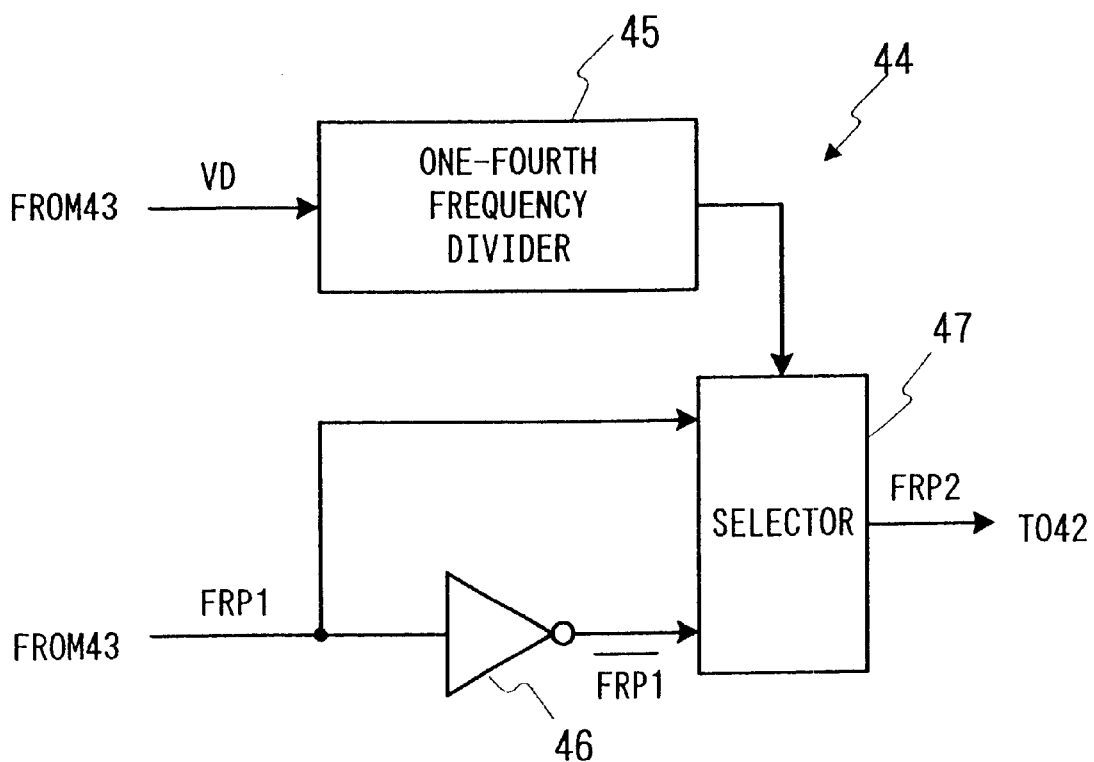
FIG. 11 shows a circuit representing one example of the polarity inverter for each frame shown FIG. 9.

FIG. 11 shows an example of the frame-by-frame polarity inverting circuit 44. As shown, the circuit 44 includes a one-fourth frequency divider 45, an inverter 46 and a selector 47. The one-fourth frequency divider 45 divides the frequency of the signal VD to one-fourth as shown in FIG. 10(c), and supplies this frequency divide signal to the selector 47. To the selector 47 are also supplied the signal FRP1 and a signal as shown in FIG. 10(d), obtained as a result of inversion of the signal FRP1 in the inverter 46. The selector 47 selectively passes either the signal FRP1 or the inversion thereof as a signal FRP2 as shown in FIG. 1(e) according to the output of the one-fourth frequency divider 45, that is, it passes the signal FRP1 when the output of the one-fourth frequency divider 45 is at L level, and passes the inversion of the signal FRP1 when that output is at H level.

As shown in FIG. 9, the signal FRP2 is supplied to the decoder/RGB driver 42. The decoder/RGB driver 42 successively displays different images in the odd and even fields of the image signal on the color LCD 1 by inverting the polarity of the image signal for every line according to the signal FRP2. The signal SYNC separated in the decoder/RGB driver 42 is supplied to the TN shutter drive circuit 12. According to the signal SYNC, the TN shutter drive circuit 12 on-off controls the TN shutter 2 for wobbling, i.e., changing the pixel positions observed via the double refractor 3 according to the direction of the polarized light transmitted through the TN shutter 2.

Figure 12:
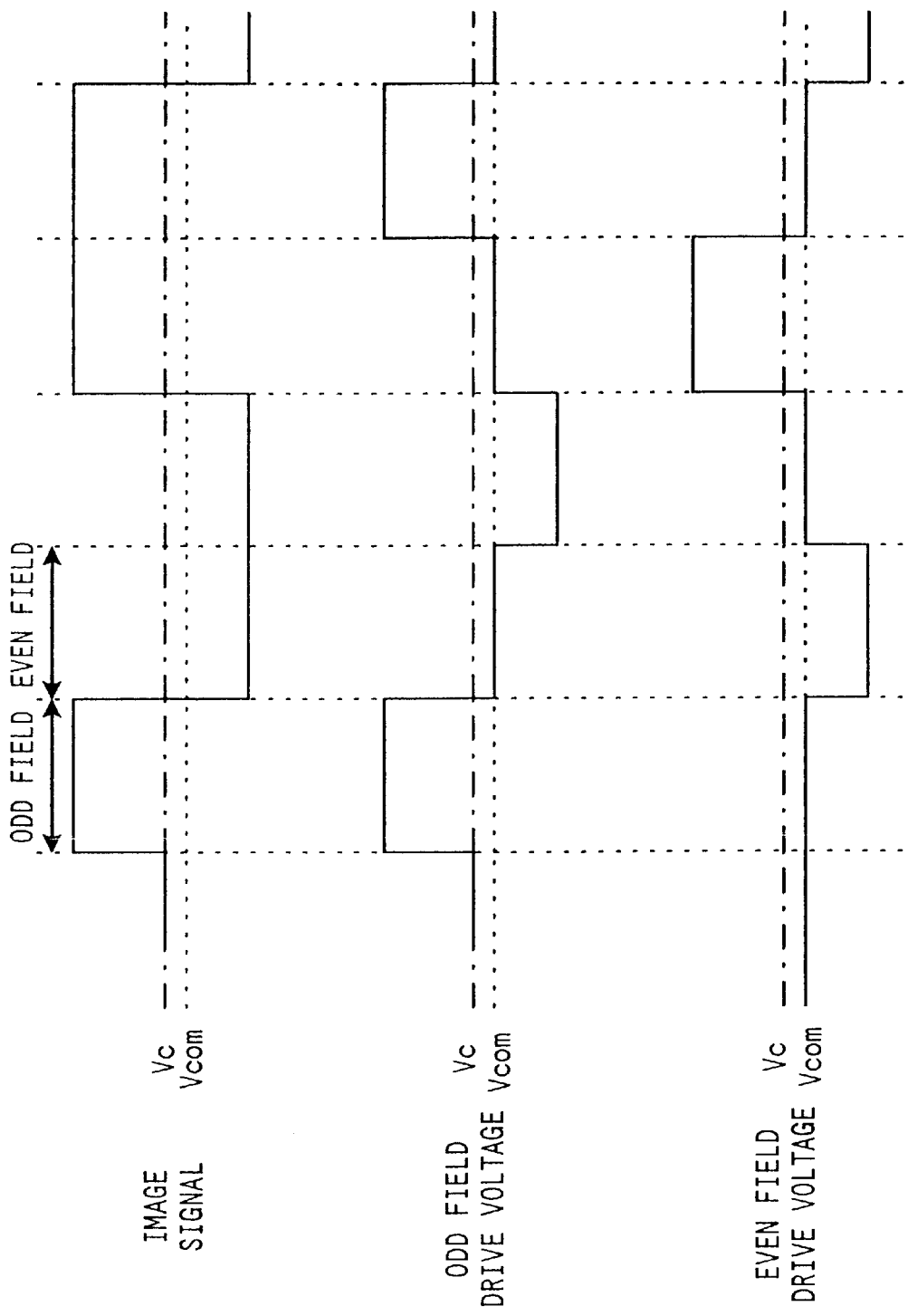
FIG. 12 shows polarities of image signal applied ton one pixel in the third embodiment.

FIG. 12 shows waveforms of signals when a pixel is considered. As shown, the polarity of the image signal applied to each pixel is inverted between adjacent odd fields and also between even fields, that is, inverted for twice changing or each frame. Thus, even if the center potential Vc of the AC drive voltage (shown by single-dash line) and the common electrode potential Vcom on the LCD fail to cincide with each other, it is possible to effectively prevent the generation bright and dark fringes as the cause of image irregularities and display high resolution and high quality images by wobbling.

Figure 13:
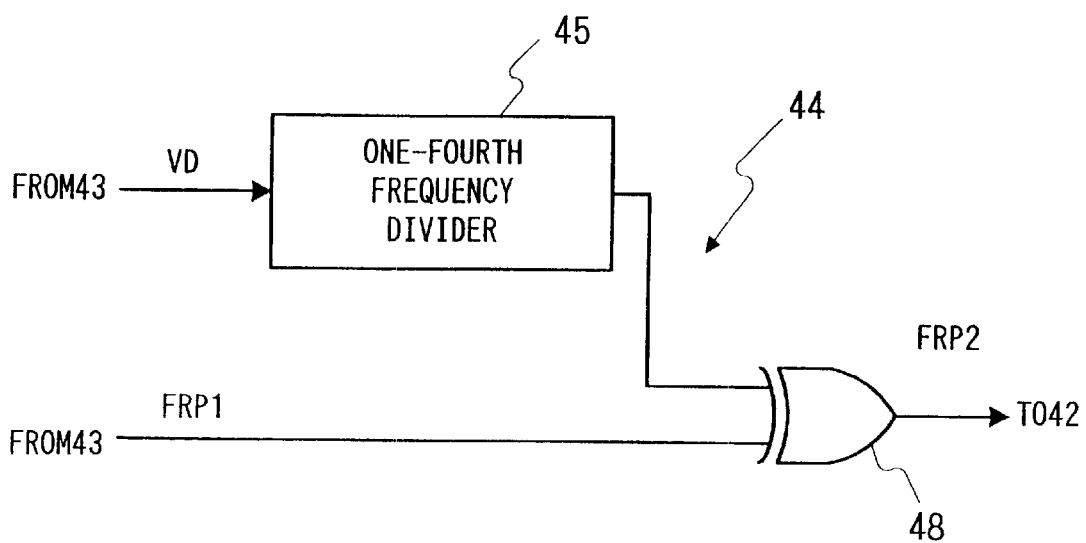
FIG. 13 shows another circuit representing one example of the polarity inverter for each frame shown FIG. 9.

While the frame-by-frame polarity inverting circuit 44 shown in FIG. 9 had the construction as shown in FIG. 11, including the one-fourth frequency divider 45, the inverter 46 and the selector 47, the same signal FRP2 as described be may also be obtained with an arrangement as shown in FIG. 13. In this case, the output of the one-fourth frequency divider 45 and the signal FRP1 are supplied to respective input terminals of an exclusive OR gate 48, which provides the signal FRP2.

For more effective prevention of the image irregularity generation, the image signal polarity may be inverted for every two switching instants in units of pixels instead of the inversion in units of lines.

Figure 38:
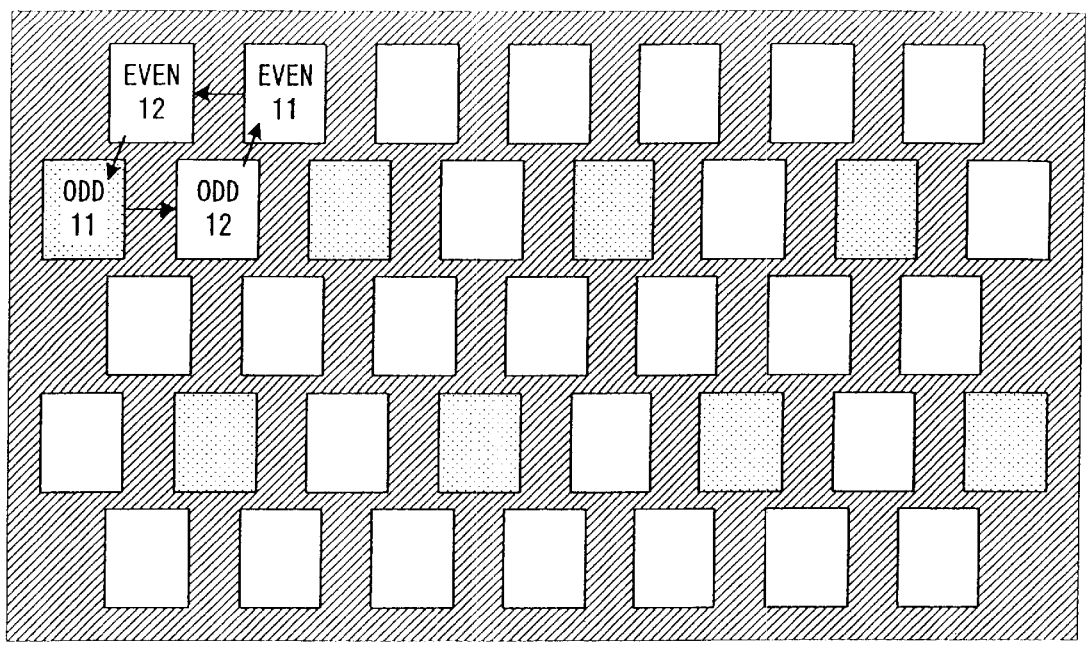
Figure 39:
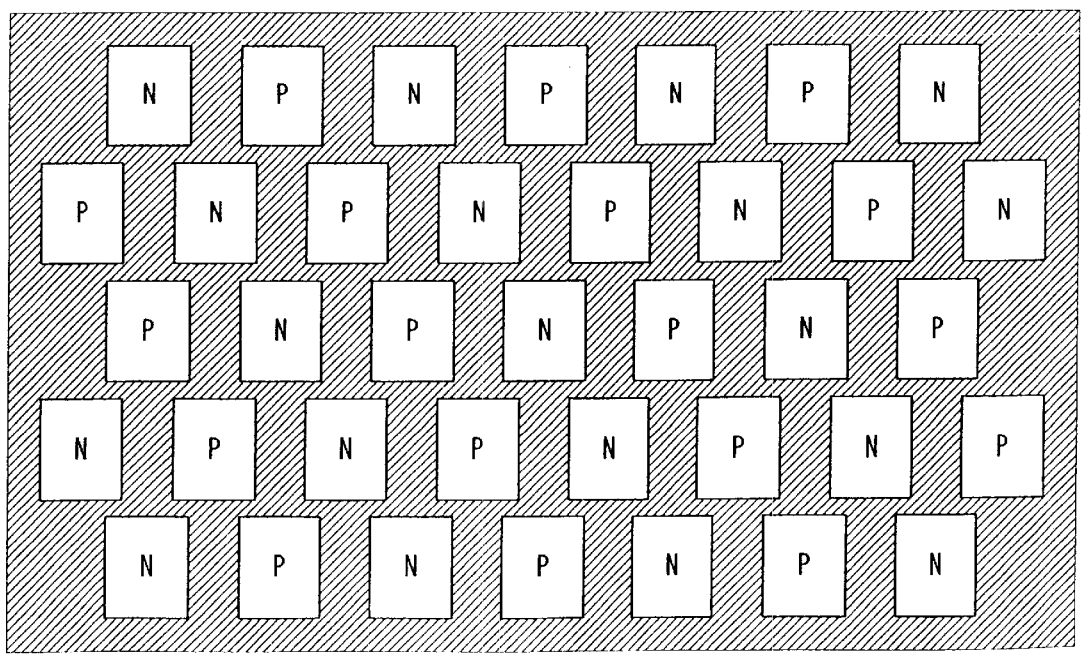
Figure 40:
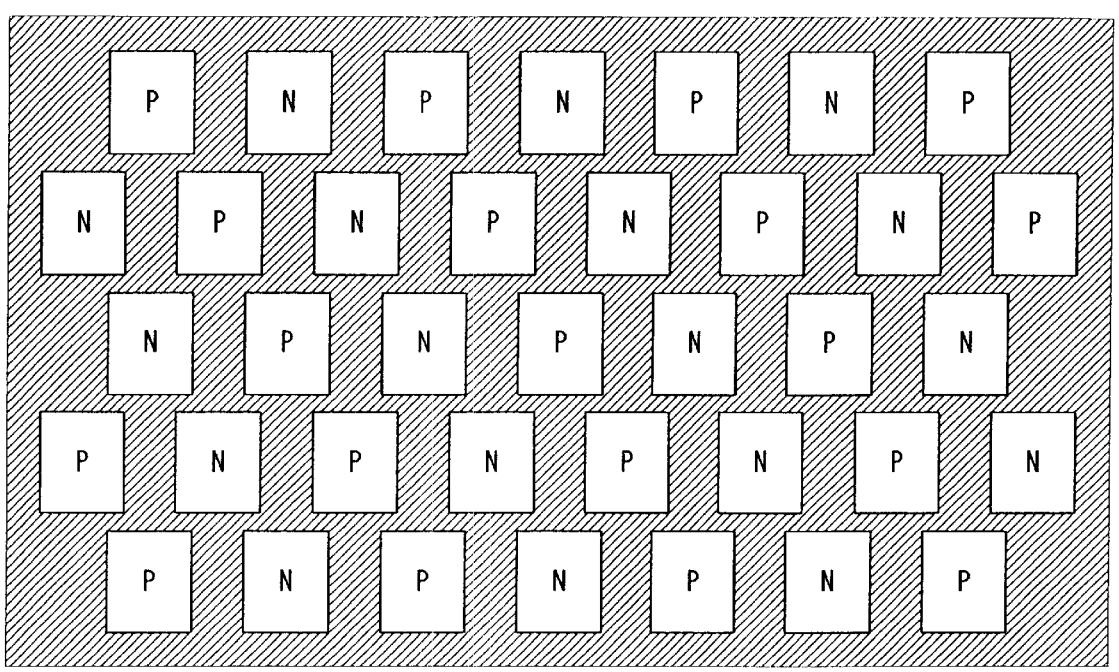

In a modification of the third embodiment, the image signal processing rate is doubled for double rate display operation as shown in FIG. 41, in which two fields of image to be displayed on a display such as an LCD, and as shown in FIG. 38 three pixels are generated optically by wobbling from an original pixel as shown shaded, thus increasing the original pixel number by four times. In this case, considering the left upper pixel shown in FIG. 38, in synchronism to the time-wise display of images Odd11, Odd12, Even11 and Even12 consituting one frame, the image position is optically shifted to four positions as shown by arrows. In the case of inverting the image signal for every display field, the image signals displayed at the four positions are of the same polarity as shown in FIG. 39 (N: negative and P: positive), thus resulting in image iregularities. Accordingly, like the above embodiment the signal FPR is controlled such that the polarity inversion takes place in every frame. In this case, as shown in FIG. 40, the image signal polarity interchange with that as shown in FIG. 39 can be obtained, and it is possible to display images with reduced image irregularities.

The third embodiment may further be suitably combined with the previous first and second embodiments for improving the wobbling effect reduction due to the temperature dependency of the response characteristics off the color LCD 1 and the TN shutter 2 or due to the response characteristics of the LCD and the TN shutter 2.

Figure 14:
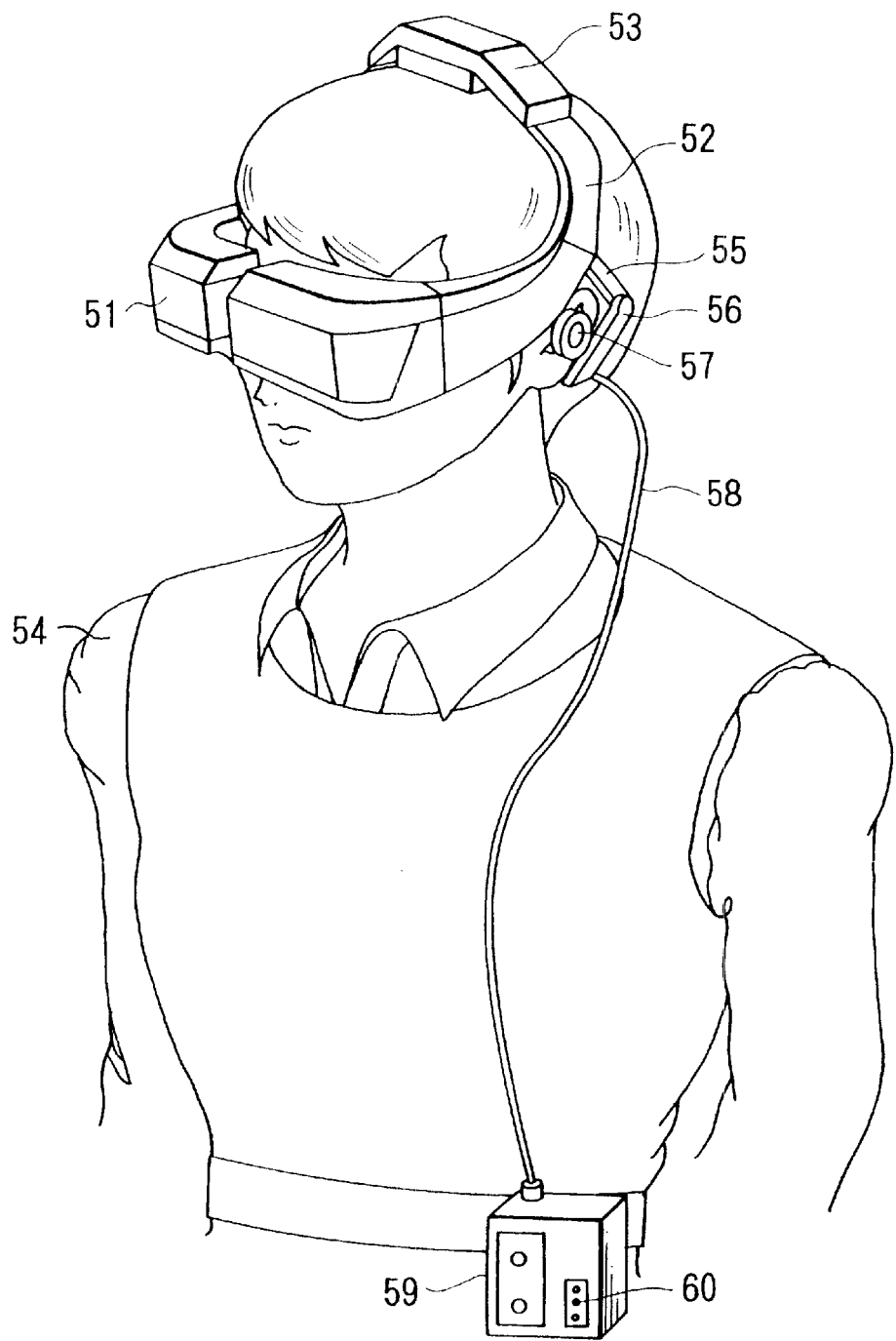
FIG. 14 shows a construction of a fourth embodiment of the image display according to the present invention.

FIG. 14 shows an example of head-mounted display (hereinafter referred to as HMD) as a fourth embodiment of the present invention. The HMD comprises a display body part 31, a side frame 52 and a top frame 53. The display body part 51 is held in front of the face of the observer 54 by mounting the side frame 52 and the top frame 53 on the head of the observer 54. The HMD further comprises a rear frame 56 mounted via a leaf spring 55 on the side frame 5, and a loudspeaker 57 provided on the rear frame 56 at a position thereof corresponding to the position of an ear of the observer 54.

Figure 15:
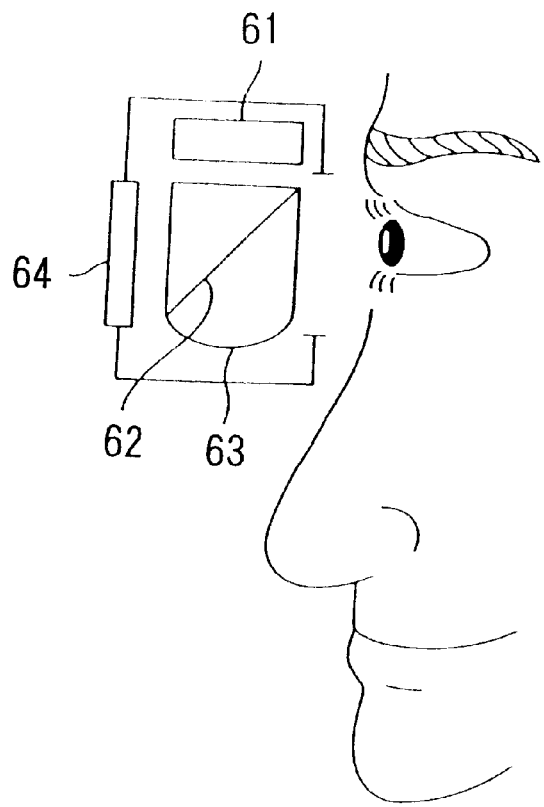
FIGS. 15(a) and 15(b) show two examples of optical systems to be provided in the display body part corresponding to left and right eyeballs in the head-mounted display shown in FIG. 14.
Figure 15:
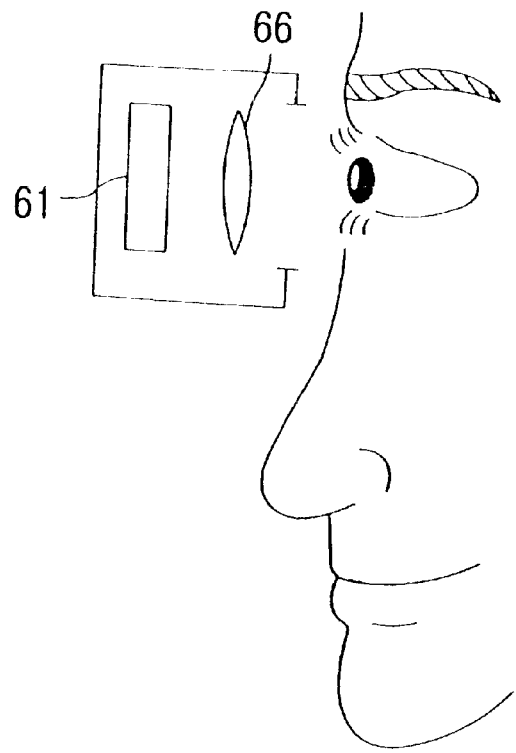

The display body part 51 includes an optical system as shown in FIGS. 15(a) and 15(b) which is provided at a position in correspondence to each eyeball of the observer 54. The optical system shown in FIG. 15(a) is of a see-through type. As shown, a display image from the image display 61 comprising the color LCD, the TN shutter and the double refractor as described before, is transmitted through a half mirror prism 62, then reflected by a convex mirror 63 and then reflected by the half mirror prism 62 to be held on the enlarged scale to the corresponding eyeball, while external image is led through for instance, a liquid crystal shutter 64 and the half mirror prism 62 to the corresponding eyeball. The opitcal system shown in FIG. 15(b) is adapted such as to lead a display image from the image display 61 having the construction as described above through an eyeball lens 66 to the corresponding eyeball.

The display body part 51 is connected via a cable 38 to a player 39 having a volume control means 60 for controlling the level of a voice signal or the like. A given image signal is supplied from the player 59 to a left and a right image displays, and the voice signal is outputted from the loudspeaker 59.

The display body part 61 can be connected via the cable 58 to an existing video deck or TV tuner for displaying images thereon. Alternatively, it may be connected to a computer or the like for displaying computer graphics images or message video from the computer. As a further alternative, the display body part 51 may be provided with an antenna for radio receiving and displaying external signals without the cable 58, As a still further alternative, it is possible to permit observation of stereo images displayed on the left and right image displays by supplying image signals providing a parallax to the image displays.

In the HMD as described, the color LCD constituting the image display is as small as, for instance, 1.3 inches and has at most 300,000 pixels. With such a color LCD the wobbling as described above is very effective for obtaining high resolution and high image quality in a wide angle HMD.

In this embodiment, the vibrating means of the left and right image displays of the HMD are adapted to cause vibrations of the optical axes, i.e., the pixel shift, in different directions to permit the wobbled images displayed on the two image displays to be observed as natural image. In the left and right image displays, the image shift is preferably executed symmetrically. For example, in the image display for the right eye the pixel shift is executed rightwardly obliquely upwards as shown in FIG. 16(a), and in the image display for the left eye it is executed leftwardly obliquely upwards as shown in FIG. 16(b).

Now, examples of the construction of an essential part of the left and right image displays, in which such image shift is executed, will now be described.

Figure 17A:
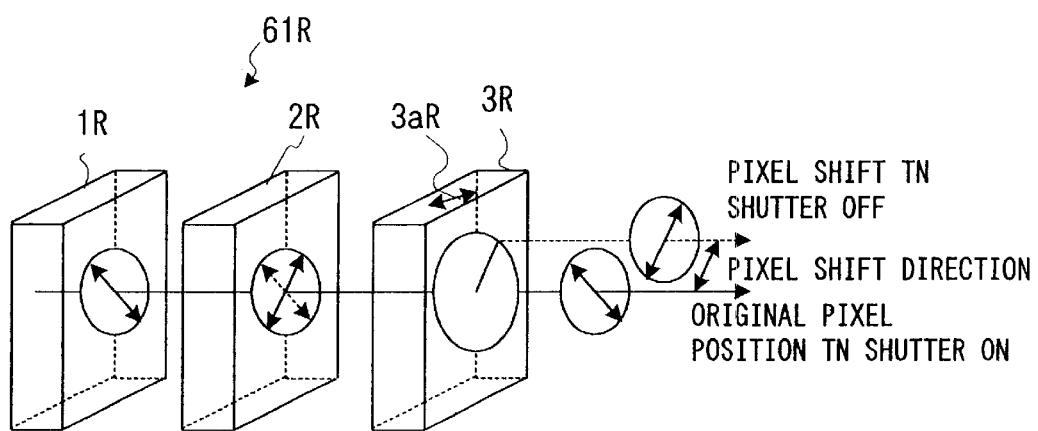
FIGS. 17(a) and 17(b) show drawings representing a first construction of the right and left image display in the fourth embodiment.

FIGS. 17(a) and 17(a) show a first example. FIG. 17(a) shows the construction of the image display 61R for the right eye, and FIG. 7(b) shows the construction of the image display 61L of the left eye. In this example, the left and right color LCDs 1L and 1R are the same in construction, and likewise the left and right TN shutters 2L and 2R are the same in construction. The crystal axes 3aL and 3aR of the left and right refractors 3L and 3R extend in different directions such that in the image display 61R for the right eye the image is displayed at the original pixel positions when the TN shutter 2R is "on" and at rightwardly obliquely upwardly shifted pixel positions when the same shutter is "off" and that in the image display 61L for the left eye it is displayed at the original pixel positions when the TN shutter 2L is "off" and at the leftwardly obliquely upwardly shifted pixel positions when the same shutter is "on".

Figure 17B:
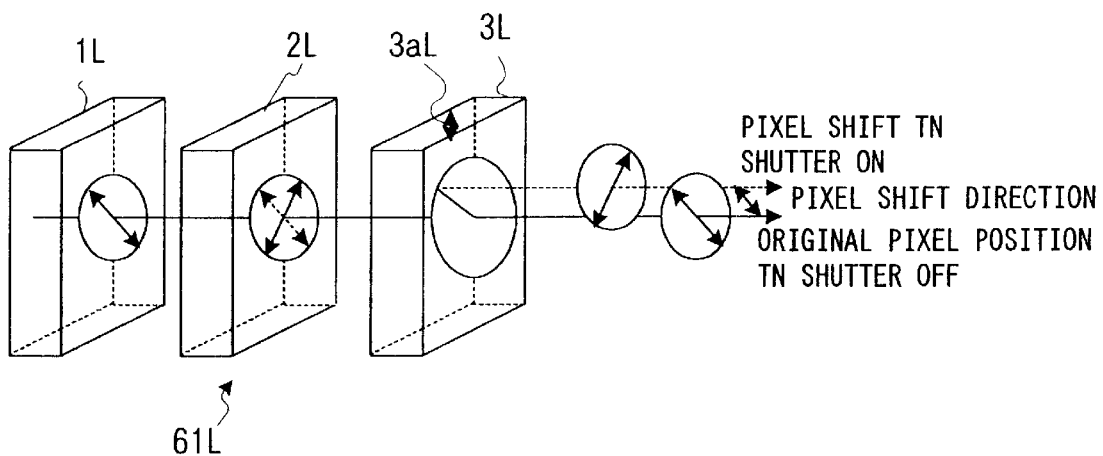
Figure 18A:
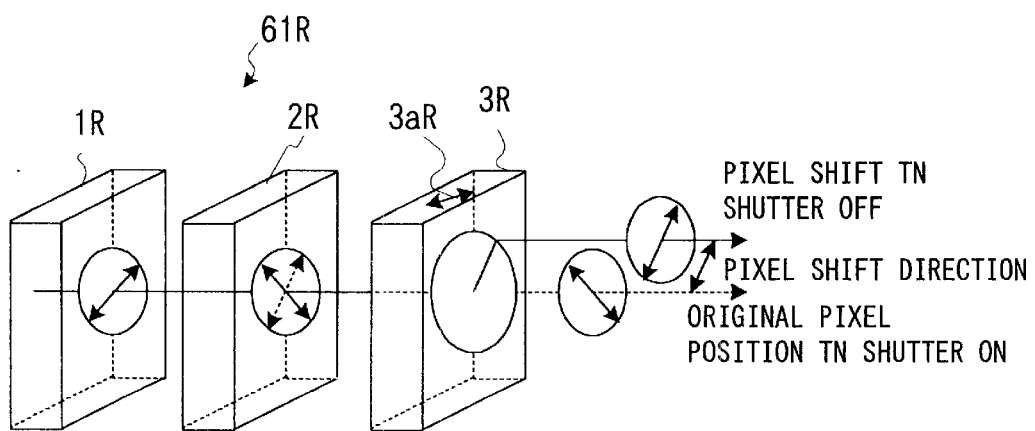
FIGS. 18(a) and 18(b) show drawings representing a second construction of the right and left image display in the fourth embodiment.
Figure 18B:
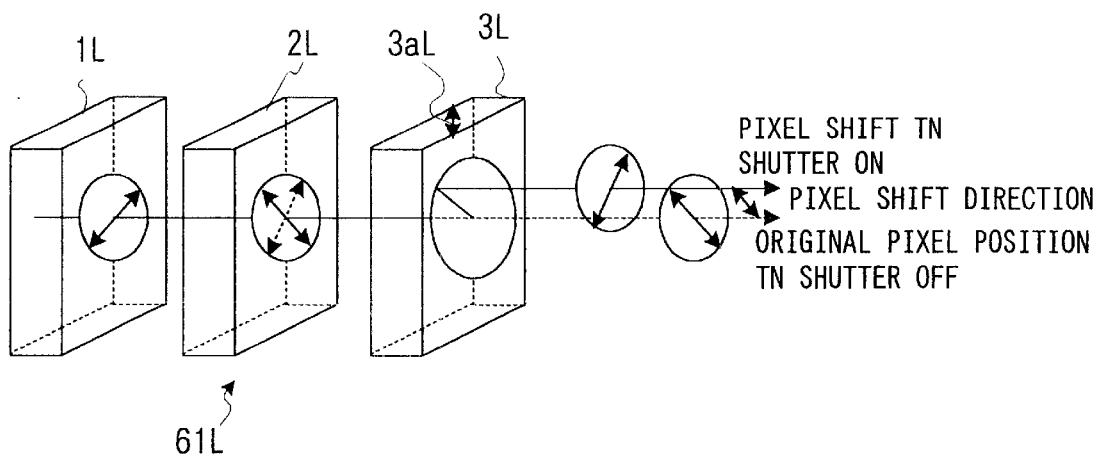

FIGS. 18(a) and 18(b) show a second example of the image displays. FIG. 18(a) shows the construction of the image display 61R for the right eye, and FIG. 18(b) shows the construction of the image display 61L for the left eye. In this example, the directions of polarization of the polarizing membres on the side of the TN shutters 2L and 2R constituting the left and right color LCDs 1L and 1R of the example shown in FIGS. 17(a) and 17(b), are set to be different from each other by 90°, so that in the image display 61R for the right eye the image is displayed at the original pixel positions when the TN shutter 2R is "off" and at rightwardly obliquely upwardly shifted pixel positions when the same shutter is "on", and that in the image display 61L for the left eye it is displayed at the original pixel positions when the TN shutter 2L is "on" and at leftwardly obliquely upwardly shifted pixel positions when the same shutter is "off".

Figure 19B:
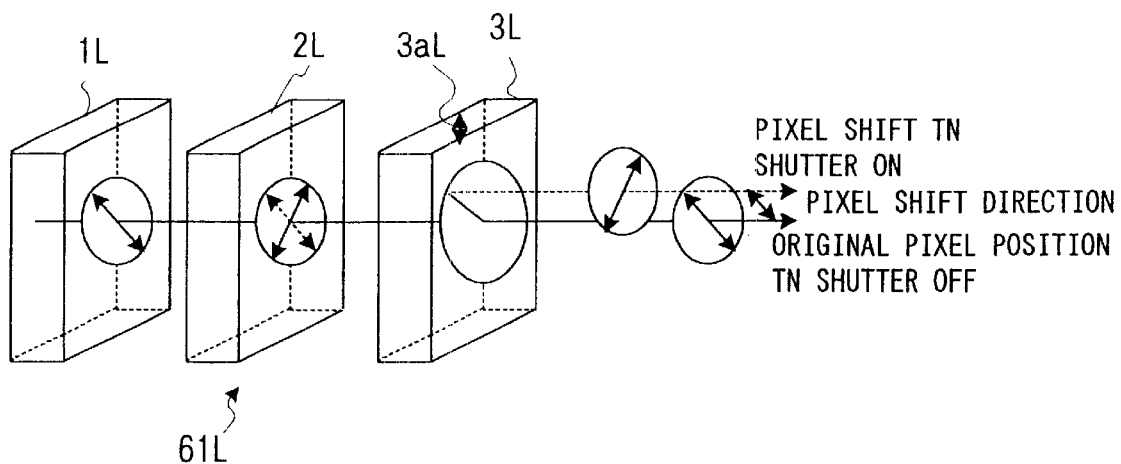

FIGS. 19(a) and 19(b) show a third example. FIG. 19(a) shows the construction of the image display 61R for the right eye, and FIG. 19(b) shows the construction of the image display 61L for the left eye. In this example, the image display 61R for the right eye has the same construction as shown in FIG. 18(a), and the image display 61L has the same construction as shown in FIG. 17(b). In the image display 61R for the right eye the image is displayed at the original pixel positions when the TN shutter 2R is "off" and at rightwardly obliquely upwardly shifted pixel positions when the same shutter is "on". In the image display 61L for the left eye the image is displayed at the original pixel positions when the TN shutter 2L is "off" and at the leftwardly obliquely upwardly shifted pixel positions when the same shutter is "on".

Figure 20A:
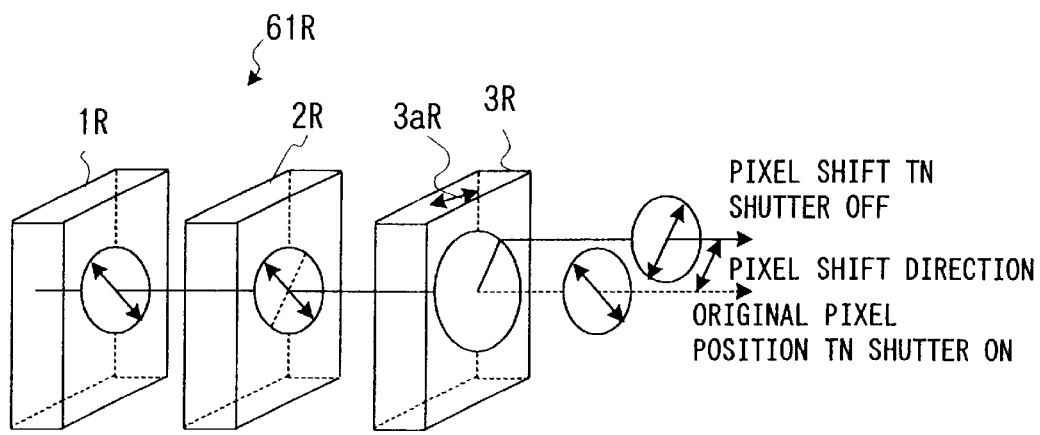
FIGS. 20(a) and 20(b) show drawings representing a forth construction of the right and left image display in the fourth embodiment.
Figure 20B:
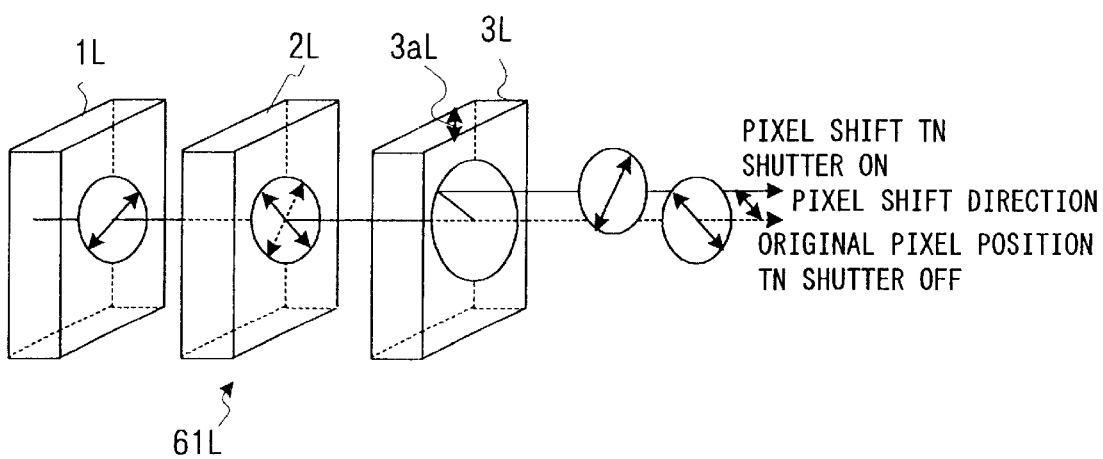

FIGS. 20(a) and 20(B) show a fourth example. FIG. 20(a) shows the construction of the image display 61R for the right eye, and FIG. 20(b) shows the construction of the image display 61L for the left eye. In this example, the construction is converse to that of the third example, that is, the image display 61R for the right eye has the same construction as that shown in FIG. 17(a), and the image display 61L for the left eye has the same construction as that shown in FIG. 18(b). In the image display 61R for the right eye the image is displayed at the original pixel positions when the TN shutter 2R is "on" and at rightardly obliquely upwardly shifted pixel positions when the shutter is "off". In the image display 61L for the left eye the image is displayed at the original pixel positions when the TN shutter 2L is "on" and at leftwardly obliquely upwardly shifted pixel positions when the shutter is "off".

Figure 21:
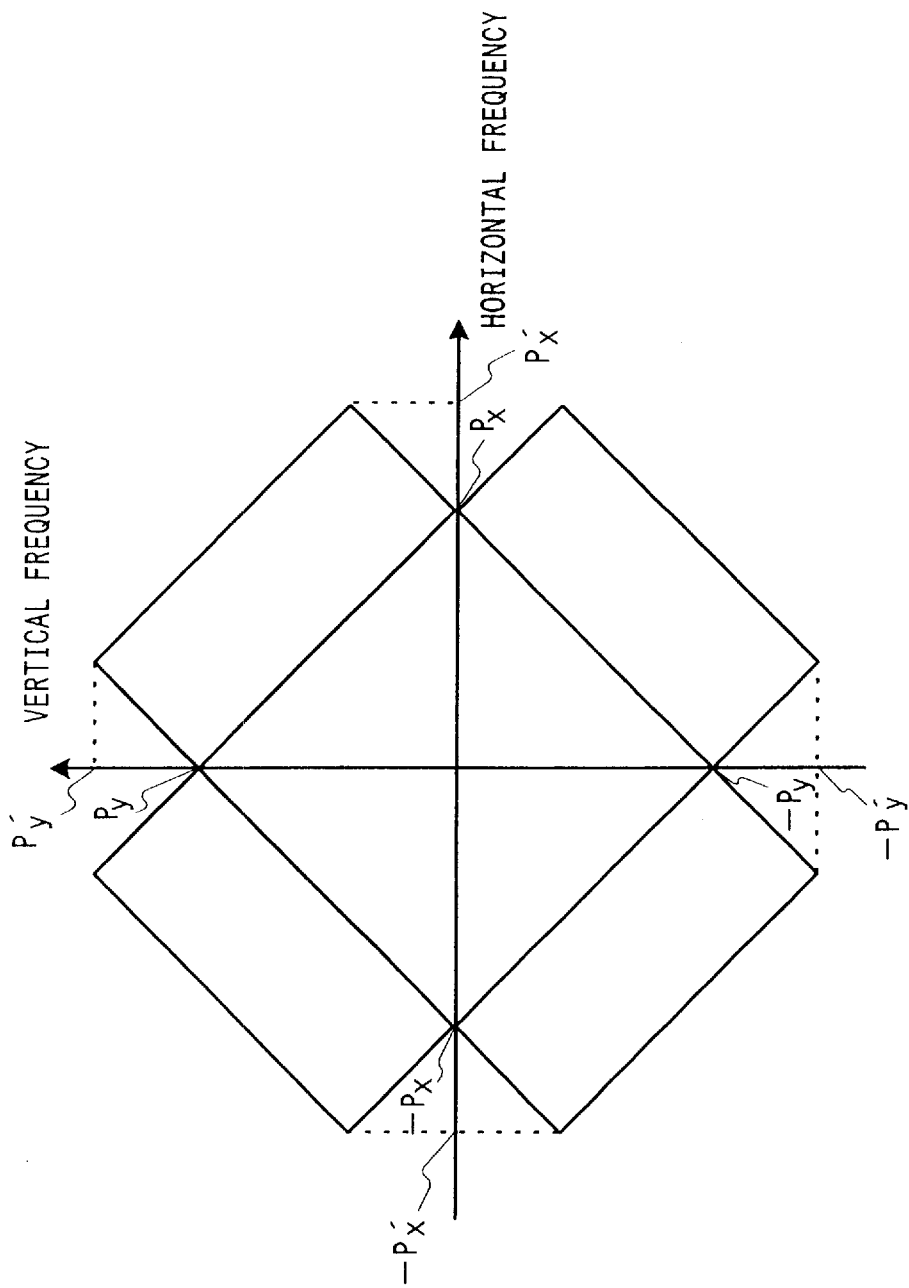
FIG. 21 shows a drawing for explaining the resolution in the frequency space in the fourth embodiment.

As has been described in the foregoing, with the left and right image displays 61L and 61R constructed such as to provide pixel shift in symmetrical leftward and rightward directions, it is possible to obtain frequency space resolution as shown in FIG. 21. Specifically, without wobbling the resolution is represented by the frequency area defined by ±Px and ±Py, whereas in this case it can be expanded to an obliquely rightwardly and leftwardly symmetrically expanded frequency area defined by ±Px' and ±Py'. Thus, it is possible to permit observation of a merged image of the images displayed on the two image displays 61L and 61R as a natural image.

While this embodiment uses the left and right image displays 61L and 61R as shown in FIG. 22, this is by no means limitative, and it is possible to appropriately combine the left and right image displays in the first to third embodiments. Also, while in this embodiment the left and right image displays 61R and 61L provide pixel shift in the rightwardly and leftwardly obliquely upward directions, respectively, this is by no means limitative. For example, they may provide pixel shift in letwardly and rightwardly obliquely upward directions, respectively. As a further altewrnative, one of the two image displays may provide pixel shift in vertical directions, while the other may provide pixel shift in horizontal directions.

Further changes and modifications of the above embodiments of the present invention are possible. For example, the field time tF of 1/60 s is by no means limittive. Also, the display element is not limited to the color LCD, but the present invention also finds effective applications to cases of using monochromatic LCDs or color or monochromatic display elements such as plasma displays, Els, and photochromics. Still further, the pixel array in the display element is not limited to the delta array, but it is also possible to adopt other arrays such as stripes arrays and mosaic arrays, and image shifted by wobbling is obtainable by interpolating the black matrix in conformity to the pixel array. Moreover, it is possible to use a well-known polarized light conversion element other than the TN shutter as well.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An image display comprising a display element having a display surface with a regular array of a plurality of pixels, an image display control means for displaying different images different in successive fields on the display element, and a vibrating means for vibrating the optical axis of light emitted from the display surface in predetermined directions in synchronism to the switching of images by the image display control means, wherein:
    the image display further comprises a temperature control means for the temperature of the vibrating means.

2. The image display according to claim 1, wherein:
    the temperature control means includes a heating means for heating the vibrating means for improving the optical axis vibration response characteristic of the vibrating means at low temperatures.

3. An image display comprising a display element having a display surface with a regular array of a plurality of pixels, an image display control means for displaying different images different in successive fields on the display element, and a vibrating means for vibrating the optical axis of light emitted from the display surface in predetermined directions in synchronism to the switching of images by the image display control means, the image display including a twist nematic liquid crystal shutter (TN shutter), a double refractor and an TN shutter drive circuit for on-off controlling the TN shutter, and a temperature control means permitting the temperature of the TN shutter to be held at a fixed temperature.

4. The image display according to claim 3, wherein the temperature control means is one of a sheet-like heater disposed around the TN shutter, a transparent electrode of the TN shutter as a heater, a Peltier element, and a transparent heater pattern for generating heat on a glass substrate of the TN shutter.

5. The image display according to claim 3, further comprises a cooling means thermally coupled to the TN shutter.

6. The image display according to claim 3, the temperature control means further controls temperature of the display elements.

7. An image display comprising a display element having a display surface with a regular array of a plurality of pixels, an image display control means for displaying different images different in successive fields on the display element, and a vibrating means for vibrating the optical axis of light emitted from the display surface in predetermined directions in synchronism to the switching of images by the image display control means, the image display including a twist nematic liquid crystal shutter (TN shutter), a double refractor and an TN shutter drive circuit for on-off controlling the TN shutter in responsive to a synchronizing signal of an image signal, wherein the TN shutter is,controlled on the basis of the display element and the TN shutter;
    wherein the TN shutter is controlled such that the transmittance to two polarized lights are substantially 50% at the instant when a time tA has passed from the instant of the field switching, tA being one half the arithmetic mean of the rise time from the instant when the light blocking factor is 0% till the instant of reaching of 100% light blocking factor.

8. An image display comprising a display element having a display surface with a regular array of a plurality of pixels, an image display control means for displaying different images different in successive fields on the display element, and a vibrating means for vibrating the optical axis of light emitted from the display surface in predetermined directions in synchronism to the switching of images by the image display control means, the image display including a twist nematic liquid crystal shutter (TN shutter), a double refractor and an TN shutter drive circuit for on-off controlling the TN shutter in responsive to a synchronizing signal of an image signal, wherein the TN shutter is controlled on the basis of the display element and the TN shutter;
    a field detecting circuit for generating a field synchronizing signal on the basis of the synchronizing signal from the display element,
    a first and a second delayed signal generating circuits for delaying the field synchronizing signal by a first and a second times, respectively, on the basis of response characteristic of the TN shutter,
    TN shutter drive signal generating circuit for generating, in response to receipt the outputs of the delayed signal generating circuits, a TN shutter drive signal,
    the TN shutter being controlled such that the transmittance to two polarized lights are substantially 50% at the instant when a time tA has passed from the instant of the field switching, tA being one half the arithmetic mean of the rise time from the instant when the light blocking factor is 0% till the instant of reaching of 100% light blocking factor.

9. An image display comprising a display element having a display surface with a regular array of a plurality of pixels, an image display control means for displaying different images different in successive fields on the display element, and a vibrating means for vibrating the optical axis of light emitted, from the display surface in predetermined directions in synchronism to the switching of images by the image display control means, the image display including a twist nematic liquid crystal shutter (TN shutter), a double refractor and an TN shutter drive circuit for on-off controlling the TN shutter in responsive to a synchronizing signal of an image signal, wherein the TN shutter is controlled on the basis of the display element and the TN shutter;

including a first and a second delayed signal generating circuits for delaying the field synchronizing signal by a first and a second time delay, respectively, on the basis of response characteristics of the TN shutter, wherein two outputs of the first and a second delayed signal generating circuits are used as a set signal and a reset signal for controlling the TN shutter.

10. An image display comprising a display element having a display surface with a regular array of a plurality of pixels, an image display control means for displaying different images different in successive fields of the display element, and a vibrating means for vibrating the optical axis of light emitted form the display surface in predetermined directions in synchronism to the switching of images by the image display control means, wherein the vibrating means vibrates the optical axis in accordance with the response characteristic of the. display element, the image display being able to handle a plurality of different response characteristics and continue to perform satisfactorily.

11. The image display according to claim 10, wherein the vibrating means includes a polarized light converting means and a driving means for driving the polarized light converting means in accordance with the response characteristic of the display element.

* * * * *